United States Patent
Takeda et al.

(10) Patent No.: US 12,199,780 B2
(45) Date of Patent: Jan. 14, 2025

(54) FEEDBACK FOR SINGLE-DOWNLINK CONTROL INFORMATION TO MULTI-CELL SCHEDULING

(71) Applicant: QUALCOMM Incorporated, San Diego, CA (US)

(72) Inventors: Kazuki Takeda, Tokyo (JP); Wanshi Chen, San Diego, CA (US); Peter Gaal, San Diego, CA (US); Xiaoxia Zhang, San Diego, CA (US); Huilin Xu, Temecula, CA (US); Mostafa Khoshnevisan, San Diego, CA (US); Tao Luo, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 320 days.

(21) Appl. No.: 17/760,135

(22) PCT Filed: Apr. 1, 2020

(86) PCT No.: PCT/CN2020/082675
§ 371 (c)(1),
(2) Date: Aug. 4, 2022

(87) PCT Pub. No.: WO2021/196064
PCT Pub. Date: Oct. 7, 2021

(65) Prior Publication Data
US 2023/0083414 A1    Mar. 16, 2023

(51) Int. Cl.
*H04L 1/18* (2023.01)
*H04L 1/1867* (2023.01)
*H04L 5/00* (2006.01)

(52) U.S. Cl.
CPC .......... *H04L 1/1887* (2013.01); *H04L 5/0053* (2013.01)

(58) Field of Classification Search
None
See application file for complete search history.

(56) References Cited

U.S. PATENT DOCUMENTS

| | | |
|---|---|---|
| 2017/0048026 A1 | 2/2017 | Park et al. |
| 2018/0006790 A1 | 1/2018 | Park et al. |
| | (Continued) | |

FOREIGN PATENT DOCUMENTS

| | | |
|---|---|---|
| WO | WO-2018210205 A1 | 11/2018 |
| WO | WO-2021162857 | 8/2021 |

OTHER PUBLICATIONS

Huawei, et al., "Overview of Bandwidth Part, CA, and DC Operation Including SRS Switching", 3GPP TSG RAN WG1 Meeting NR#3, R1-1715425, 3rd Generation Partnership Project, Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017, XP051338893, 14 Pages, Section 7.2, 7.3, figures 7-8.

(Continued)

*Primary Examiner* — Eunsook Choi
(74) *Attorney, Agent, or Firm* — Holland & Hart LLP

(57) ABSTRACT

Methods, systems, and devices for wireless communications are described. A user equipment (UE) may communicate over multiple component carriers (CCs). The UE may receive control signaling indicating a joint feedback codebook configuration for jointly reporting feedback for a first CC, a second CC, and a virtual CC that may be mapped to a third CC and a fourth CC. The CE may then receive downlink control information (DCI) scheduling a first downlink transmission via the first CC and a second downlink transmission on the second CC, or both downlink transmissions may be scheduled via the virtual CC. The UE may transmit a joint feedback message for the first CC, the (Continued)

second CC, and the virtual CC based on the joint codebook configuration.

80 Claims, 18 Drawing Sheets

(56) References Cited

U.S. PATENT DOCUMENTS

| | | | |
|---|---|---|---|
| 2020/0036480 A1 | 1/2020 | Yang et al. | |
| 2020/0067574 A1* | 2/2020 | Yang | H04W 72/121 |
| 2021/0050961 A1* | 2/2021 | Chen Larsson | H04L 1/1861 |
| 2021/0152295 A1* | 5/2021 | Falconetti | H04L 1/1887 |
| 2021/0258998 A1 | 8/2021 | Khoshnevisan et al. | |
| 2022/0061074 A1* | 2/2022 | Babaei | H04L 5/0053 |
| 2022/0303064 A1* | 9/2022 | Yang | H04W 72/23 |

OTHER PUBLICATIONS

Supplementary European Search Report—EP20929287—Search Authority—The Hague—Sep. 20, 2023 (203398EP).
Institute for Information Industry (III): "Enhancements to DL SPS", 3GPP TSG RAN WG1 #99, R1-1912778, Reno, USA, Nov. 18-22, 2019, Nov. 22, 2019 (Nov. 22, 2019) the Whole Document, pp. 1-5.
International Search Report and Written Opinion—PCT/CN2020/082675—ISA/EPO—Dec. 30, 2020 (203398WO1).

* cited by examiner

FEEDBACK FOR SINGLE-DOWNLINK CONTROL INFORMATION TO MULTI-CELL SCHEDULING

CROSS REFERENCE

The present Application is a 371 national stage filing of International PCT Application No. PCT/CN2020/082675 by Takeda et al. entitled "FEEDBACK FOR SINGLE-DOWNLINK CONTROL INFORMATION TO MULTI-CELL SCHEDULING," filed Apr. 1, 2020, which is assigned to the assignee hereof, and each of which is expressly incorporated by reference in its entirety herein.

FIELD OF TECHNOLOGY

The following relates generally to wireless communications and more specifically to feedback for single-downlink control information (DCI) to multi-cell scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate over multiple component carriers (CCs). The communication may include receiving control information scheduling shared channel transmissions by the UE on multiple cells.

SUMMARY

The described techniques relate to improved methods, systems, devices, and apparatuses that support feedback for single-downlink control information (DCI) to multi-cell scheduling. Generally, the described techniques provide for a user equipment (UE) transmitting feedback information for communications over multiple component carriers (CCs). A UE communicate with a base station over multiple CCs. The UE may receive control signaling indicating a joint feedback codebook configuration for jointly reporting feedback for a first CC, a second CC, and a virtual CC that may be mapped to a third CC and a fourth CC. The UE may then receive DCI scheduling a first downlink transmission via the first CC and a second downlink transmission on the second CC, or both downlink transmissions may be scheduled via the virtual CC. The UE may transmit a joint feedback message for the first CC, the second CC, and the virtual CC based on the joint codebook configuration.

A method of wireless communications by a UE is described. The method may include receiving control signaling indicating a joint feedback codebook configuration for jointly reporting feedback for a first CC, a second CC, and a virtual CC that is mapped to a third CC and a fourth CC, receiving DCI scheduling a first downlink transmission via the first component carrier and a second downlink transmission on the second CC, or scheduling the first downlink transmission and the second downlink transmission via the virtual CC, and transmitting a joint feedback message for the first CC, the second CC, and the virtual CC based on the joint feedback codebook configuration.

An apparatus for wireless communications by a UE is described. The apparatus may include a processor, memory coupled with the processor, and instructions stored in the memory. The instructions may be executable by the processor to cause the apparatus to receive control signaling indicating a joint feedback codebook configuration for jointly reporting feedback for a first CC, a second CC, and a virtual CC that is mapped to a third CC and a fourth CC, receive DCI scheduling a first downlink transmission via the first CC and a second downlink transmission on the second CC, or scheduling the first downlink transmission and the second downlink transmission via the virtual CC, and transmit a joint feedback message for the first CC, the second CC, and the virtual CC based on the joint feedback codebook configuration.

Another apparatus for wireless communications by a UE is described. The apparatus may include means for receiving control signaling indicating a joint feedback codebook configuration for jointly reporting feedback for a first CC, a second CC, and a virtual CC that is mapped to a third CC and a fourth CC, receiving DCI scheduling a first downlink transmission via the first CC and a second downlink transmission on the second CC, or scheduling the first downlink transmission and the second downlink transmission via the virtual CC, and transmitting a joint feedback message for the first CC, the second CC, and the virtual CC based on the joint feedback codebook configuration.

A non-transitory computer-readable medium storing code for wireless communications by a UE is described. The code may include instructions executable by a processor to receive control signaling indicating a joint feedback codebook configuration for jointly reporting feedback for a first CC, a second CC, and a virtual CC that is mapped to a third CC and a fourth CC, receive DCI scheduling a first downlink transmission via the first CC and a second downlink transmission on the second CC, or scheduling the first downlink transmission and the second downlink transmission via the virtual CC, and transmit a joint feedback message for the first CC, the second CC, and the virtual CC based on the joint feedback codebook configuration.

In some examples of the method, apparatuses, and non-transitory computer-readable medium described herein, receiving the control signaling may include operations, features, means, or instructions for receiving the control signaling indicating the joint feedback codebook configuration that may be a semi-static joint feedback codebook configuration.

In some examples of the method, apparatuses, and non-transitory computer-readable medium described herein, receiving the control signaling may include operations, features, means, or instructions for receiving the control signaling that indicates a first shared data channel occasion on the first CC, a second shared data channel occasion on the second CC, and a first virtual shared data channel occasion and a second virtual shared data channel occasion on the virtual CC.

In some examples of the method, apparatuses, and non-transitory computer-readable medium described herein, transmitting the joint feedback message may include operations, features, means, or instructions for transmitting the joint feedback message including feedback data for the first shared data channel occasion, the second shared data channel occasion, the first virtual shared data channel occasion, and the second virtual shared data channel occasion.

In some examples of the method, apparatuses, and non-transitory computer-readable medium described herein, transmitting the joint feedback message may include operations, features, means, or instructions for transmitting the joint feedback message including feedback data that includes one or two bits, depending on a number of possible codewords, for each of the first shared data channel occasion, the second shared data channel occasion, the first virtual shared data channel occasion, and the second virtual shared data channel occasion.

In some examples of the method, apparatuses, and non-transitory computer-readable medium described herein, the first CC may be the third CC, the second CC may be the fourth CC, or both, and where transmitting the joint feedback message may include operations, features, means, or instructions for transmitting the joint feedback message including feedback data that includes fewer than a single bit for each of the first shared data channel occasion, the second shared data channel occasion, the first virtual shared data channel occasion, and the second virtual shared data channel occasion, based on the first shared data channel occasion corresponding to a same resource as the first virtual shared data channel occasion, the second shared data channel occasion corresponding to a same resource as the second virtual shared data channel occasion, or both.

In some examples of the method, apparatuses, and non-transitory computer-readable medium described herein, the first CC may be the third CC, the second CC may be the fourth CC, or both, and where receiving the control signaling may include operations, features, means, or instructions for receiving the control signaling indicating that the first CC, the second CC, or both, may have a different starting and length indicator value configuration than the third CC belonging to the virtual CC, the fourth CC belonging to the virtual CC, or both.

In some examples of the method, apparatuses, and non-transitory computer-readable medium described herein, transmitting the joint feedback message may include operations, features, means, or instructions for transmitting the joint feedback message in a control channel resource indicated by the DCI that may be a latest received DCI as determined by a lowest index or a highest index out of the first CC, the second CC, and the virtual CC.

In some examples of the method, apparatuses, and non-transitory computer-readable medium described herein, transmitting the joint feedback message may include operations, features, means, or instructions for transmitting the joint feedback message in a control channel resource indicated by the DCI that may be a latest received DCI as determined by a lowest index or a highest index out of the first CC and the second CC.

In some examples of the method, apparatuses, and non-transitory computer-readable medium described herein, transmitting the joint feedback message may include operations, features, means, or instructions for transmitting the joint feedback message in a control channel resource indicated by the DCI that may be a latest received DCI as determined by a lowest index or a highest index out of the first CC, the second CC, the third CC belonging to the virtual CC, and the fourth CC belonging to the virtual CC.

Some examples of the method, apparatuses, and non-transitory computer-readable medium described herein may further include operations, features, means, or instructions for receiving a control channel resource configuration that may be common across single DCI to single CC scheduling and single DCI to multiple CC scheduling, where the joint feedback message may be transmitted in a control channel resource indicated in the control channel resource configuration.

Some examples of the method, apparatuses, and non-transitory computer-readable medium described herein may further include operations, features, means, or instructions for receiving a first control channel resource configuration for single DCI to single CC scheduling, and receiving a second control channel resource configuration for single DCI to multiple CC scheduling that may be different than the first control channel resource configuration.

In some examples of the method, apparatuses, and non-transitory computer-readable medium described herein, transmitting the joint feedback message may include operations, features, means, or instructions for transmitting the joint feedback message in a control channel resource configured for the first CC or the second CC in the second control channel resource configuration based on receiving the DCI on a corresponding one of the first CC or the CC.

In some examples of the method, apparatuses, and non-transitory computer-readable medium described herein, transmitting the joint feedback message may include operations, features, means, or instructions for transmitting the joint feedback message in a control channel resource configured for the virtual CC in the second control channel resource configuration based on receiving the DCI on the virtual CC.

In some examples of the method, apparatuses, and non-transitory computer-readable medium described herein, receiving the control signaling may include operations, features, means, or instructions for receiving the control signaling configuring the UE with the joint feedback codebook configuration that may be a dynamic joint feedback codebook configuration.

In some examples of the method, apparatuses, and non-transitory computer-readable medium described herein, transmitting the joint feedback message may include operations, features, means, or instructions for transmitting the joint feedback message having joint feedback data that may be generated based on a counter value indicated in the DCI.

In some examples of the method, apparatuses, and non-transitory computer-readable medium described herein, a number by which the counter value may be incremented to generate the joint feedback data may be based on the DCI scheduling the virtual CC and whether feedback bundling may be configured for the first CC and the second CC.

In some examples of the method, apparatuses, and non-transitory computer-readable medium described herein, a number by which the counter value may be incremented to generate the joint feedback data may be based on the DCI scheduling the virtual CC and whether the DCI schedules one or both of the first CC and the second CC.

In some examples of the method, apparatuses, and non-transitory computer-readable medium described herein, the first CC may be the third CC, the second CC may be the fourth CC, or both.

A method of wireless communications by a base station is described. The method may include transmitting control signaling indicating a joint feedback codebook configuration for jointly reporting feedback for a first CC, a second CC, and a virtual CC that is mapped to a third CC and a fourth CC, transmitting DCI scheduling a first downlink transmission via the first CC and a second downlink transmission on the second CC, or scheduling the first downlink transmission and the second downlink transmission via the virtual CC, and receiving a joint feedback message for the first CC, the second CC, and the virtual CC based on the joint feedback codebook configuration.

An apparatus for wireless communications by a base station is described. The apparatus may include a processor, memory coupled with the processor, and instructions stored in the memory. The instructions may be executable by the processor to cause the apparatus to transmit control signaling indicating a joint feedback codebook configuration for jointly reporting feedback for a first CC, a second CC, and a virtual CC that is mapped to a third CC and a fourth CC, transmit DCI scheduling a first downlink transmission via the first CC and a second downlink transmission on the second CC, or scheduling the first downlink transmission and the second downlink transmission via the virtual CC, and receive a joint feedback message for the first CC, the second CC, and the virtual CC based on the joint feedback codebook configuration.

Another apparatus for wireless communications by a base station is described. The apparatus may include means for transmitting control signaling indicating a joint feedback codebook configuration for jointly reporting feedback for a first CC, a second CC, and a virtual CC that is mapped to a third CC and a fourth CC, transmitting DCI scheduling a first downlink transmission via the first CC and a second downlink transmission on the second CC, or scheduling the first downlink transmission and the second downlink transmission via the virtual CC, and receiving a joint feedback message for the first CC, the second CC, and the virtual CC based on the joint feedback codebook configuration.

A non-transitory computer-readable medium storing code for wireless communications by a base station is described. The code may include instructions executable by a processor to transmit control signaling indicating a joint feedback codebook configuration for jointly reporting feedback for a first CC, a second CC, and a virtual CC that is mapped to a third CC and a fourth CC, transmit DCI scheduling a first downlink transmission via the first CC and a second downlink transmission on the second CC, or scheduling the first downlink transmission and the second downlink transmission via the virtual CC, and receive a joint feedback message for the first CC, the second CC, and the virtual CC based on the joint feedback codebook configuration.

In some examples of the method, apparatuses, and non-transitory computer-readable medium described herein, transmitting the control signaling may include operations, features, means, or instructions for transmitting the control signaling indicating the joint feedback codebook configuration that may be a semi-static joint feedback codebook configuration.

In some examples of the method, apparatuses, and non-transitory computer-readable medium described herein, transmitting the control signaling may include operations, features, means, or instructions for transmitting the control signaling that indicates a first shared data channel occasion on the first CC, a second shared data channel occasion on the second CC, and a first virtual shared data channel occasion and a second virtual shared data channel occasion on the virtual CC.

In some examples of the method, apparatuses, and non-transitory computer-readable medium described herein, receiving the joint feedback message may include operations, features, means, or instructions for receiving the joint feedback message including feedback data for the first shared data channel occasion, the second shared data channel occasion, the first virtual shared data channel occasion, and the second virtual shared data channel occasion.

In some examples of the method, apparatuses, and non-transitory computer-readable medium described herein, receiving the joint feedback message may include operations, features, means, or instructions for receiving the joint feedback message including feedback data that includes one or two bits, depending on a number of possible codewords, for each of the first shared data channel occasion, the second shared data channel occasion, the first virtual shared data channel occasion, and the second virtual shared data channel occasion.

In some examples of the method, apparatuses, and non-transitory computer-readable medium described herein, the first CC may be the third CC, the second CC may be the fourth CC, or both, and where receiving the joint feedback message may include operations, features, means, or instructions for receiving the joint feedback message including feedback data that includes fewer than a single bit for each of the first shared data channel occasion, the second shared data channel occasion, the first virtual shared data channel occasion, and the second virtual shared data channel occasion, based on the first shared data channel occasion corresponding to a same resource as the first virtual shared data channel occasion, the second shared data channel occasion corresponding to a same resource as the second virtual shared data channel occasion, or both.

In some examples of the method, apparatuses, and non-transitory computer-readable medium described herein, the first CC may be the third CC, the second CC may be the fourth CC, or both, and where transmitting the control signaling may include operations, features, means, or instructions for transmitting the control signaling indicating that the first CC, the second CC, or both, may have a different starting and length indicator value configuration than the third CC belonging to the virtual CC, the fourth CC belonging to the virtual CC, or both.

In some examples of the method, apparatuses, and non-transitory computer-readable medium described herein, receiving the joint feedback message may include operations, features, means, or instructions for receiving the joint feedback message in a control channel resource indicated by the DCI that may be a latest received DCI as determined by a lowest index or a highest index out of the first CC, the second CC, and the virtual CC.

In some examples of the method, apparatuses, and non-transitory computer-readable medium described herein, receiving the joint feedback message may include operations, features, means, or instructions for receiving the joint feedback message in a control channel resource indicated by the DCI that may be a latest received DCI as determined by a lowest index or a highest index out of the first CC and the second CC.

In some examples of the method, apparatuses, and non-transitory computer-readable medium described herein, receiving the joint feedback message may include operations, features, means, or instructions for receiving the joint feedback message in a control channel resource indicated by the DCI that may be a latest received DCI as determined by a lowest index or a highest index out of the first CC, the second CC, the third CC belonging to the virtual CC, and the fourth CC belonging to the virtual CC.

Some examples of the method, apparatuses, and non-transitory computer-readable medium described herein may further include operations, features, means, or instructions for transmitting a control channel resource configuration that may be common across single DCI to single CC scheduling and single DCI to multiple CC scheduling, where the joint feedback message may be transmitted in a control channel resource indicated in the control channel resource configuration.

Some examples of the method, apparatuses, and non-transitory computer-readable medium described herein may further include operations, features, means, or instructions for transmitting a first control channel resource configuration for single DCI to single CC scheduling, and transmitting a second control channel resource configuration for single DCI to multiple CC scheduling that may be different than the first control channel resource configuration.

In some examples of the method, apparatuses, and non-transitory computer-readable medium described herein, receiving the joint feedback message may include operations, features, means, or instructions for receiving the joint feedback message in a control channel resource configured for the first CC or the second CC in the second control channel resource configuration based on receiving the DCI on a corresponding one of the first CC or the CC.

In some examples of the method, apparatuses, and non-transitory computer-readable medium described herein, receiving the joint feedback message may include operations, features, means, or instructions for receiving the joint feedback message in a control channel resource configured for the virtual CC in the second control channel resource configuration based on receiving the DCI on the virtual CC.

In some examples of the method, apparatuses, and non-transitory computer-readable medium described herein, transmitting the control signaling may include operations, features, means, or instructions for transmitting the control signaling configuring a UE with the joint feedback codebook configuration that may be a dynamic joint feedback codebook configuration.

In some examples of the method, apparatuses, and non-transitory computer-readable medium described herein, receiving the joint feedback message may include operations, features, means, or instructions for receiving the joint feedback message having joint feedback data that may be generated based on a counter value indicated in the DCI.

In some examples of the method, apparatuses, and non-transitory computer-readable medium described herein, a number by which the counter value may be incremented to generate the joint feedback data may be based on the DCI scheduling the virtual CC and whether feedback bundling may be configured for the first CC and the second CC.

In some examples of the method, apparatuses, and non-transitory computer-readable medium described herein, a number by which the counter value may be incremented to generate the joint feedback data may be based on the DCI scheduling the virtual CC and whether the DCI schedules one or both of the first CC and the second CC.

In some examples of the method, apparatuses, and non-transitory computer-readable medium described herein, the first CC may be the third CC, the second CC may be the fourth CC, or both.

DETAILED DESCRIPTION

In wireless communication systems, a first component carrier (CC) may transport DCI (DCI) that may be used to schedule a downlink transmission on the first CC or on a second, different CC, or both. The downlink transmissions may be transmitted by the base station in a physical downlink shared channel (PDSCH). The UE may receive the DCI, and then monitor for the scheduled transmission(s) in the first CC or the second CC, or both. Based on receiving the transmissions, the UE 115 may generate hybrid automatic repeat request (HARQ) feedback, including acknowledgment (ACK) or negative acknowledgment (NACK) feedback bits. The UE may then transmit the ACK/NACK bits to the base station in a resource for a physical uplink control channel (PUCCH). The base station may receive the feedback and may be aware of whether the UE successfully received and decoded the downlink transmission(s) in the PDSCH.

In some cases, the UE may receive and decode a physical downlink control channel (PDCCH) to obtain a single DCI that may schedule a PDSCH transmission for reception by the UE on multiple (e.g., two) CCs. In some cases, the CCs may be actual CCs. In some cases, the UE that receives the single DCI scheduling the PDSCH transmission on multiple CCs may process the received multiple CC scheduling as if the multiple CCs on which the PDSCH transmission is received on is a single virtual CC. For example, a base station may configure a UE with two actual CCs and a virtual CC that may be mapped to one or both the two actual CCs, or may be mapped to two different actual CCs. The base station may transmit DCI that cross-carrier schedules the two actual CCs or schedules the virtual CC.

The base station may transmit a joint feedback codebook configuration to configure the UE to provide joint feedback for the two actual CCs and the virtual CC. Based on the cross-carrier scheduling in the DCI, and based on the feedback codebook configuration, the UE may generate joint feedback that includes ACK/NACK feedback data for each of the two actual CCs, and the virtual CC. The UE may transmit the joint feedback to the base station according to the scheduling information and feedback codebook configuration received from the base station. This communication configuration may be used in cases of dynamic spectrum sharing (DSS) (e.g., New Radio (NR) DSS). In some cases, one or multiple of the CCs may be CCs that are shared by the LTE system and NR system.

Aspects of the disclosure are initially described in the context of wireless communications systems. Aspects of the disclosure are then described with respect to cell schedules, carrier schedules, slot diagrams, and process flows. Aspects of the disclosure are further illustrated by and described with reference to apparatus diagrams, system diagrams, and flowcharts that relate to feedback for single-DCI to multi-cell scheduling.

Figure 1:
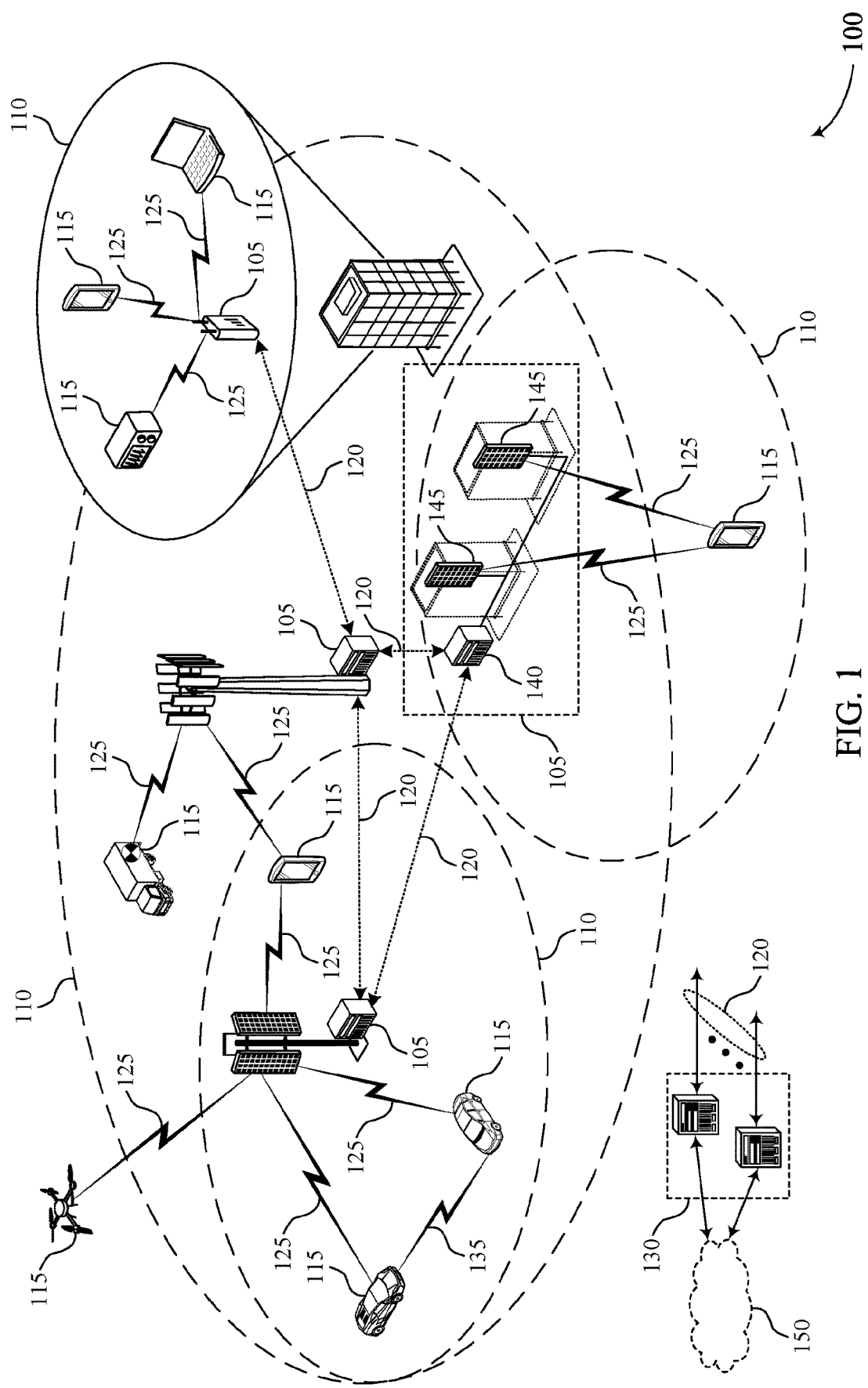
FIG. 1 illustrates an example of a wireless communications system that supports feedback for single-downlink control information (DCI) to multi-cell scheduling in accordance with aspects of the present disclosure.

FIG. 1 illustrates an example of a wireless communications system 100 that supports feedback for single-DCI to multi-cell scheduling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115.

A carrier may be operated in a standalone mode where initial acquisition and connection may be conducted by the UEs 115 via the carrier, or the carrier may be operated in a non-standalone mode where a connection is anchored via a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $Ts=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may transmit feedback information for communications over multiple CCs. A UE 115 may communicate with a base station 105 over multiple CCs. The UE 115 may receive control signaling indicating a joint feedback codebook configuration for jointly reporting feedback for a first CC, a second CC, and a virtual CC that may be mapped to a third CC and a fourth CC. The third CC and the fourth CC may be the same as or may differ form the first and second CCs. The UE 115 may then receive DCI scheduling a first downlink transmission via the first CC and a second downlink transmission on the second CC, or both downlink transmissions may be scheduled via the virtual CC. The UE 115 may transmit a joint feedback message for the first CC, the second CC, and the virtual CC based on the joint codebook configuration.

Figure 2:
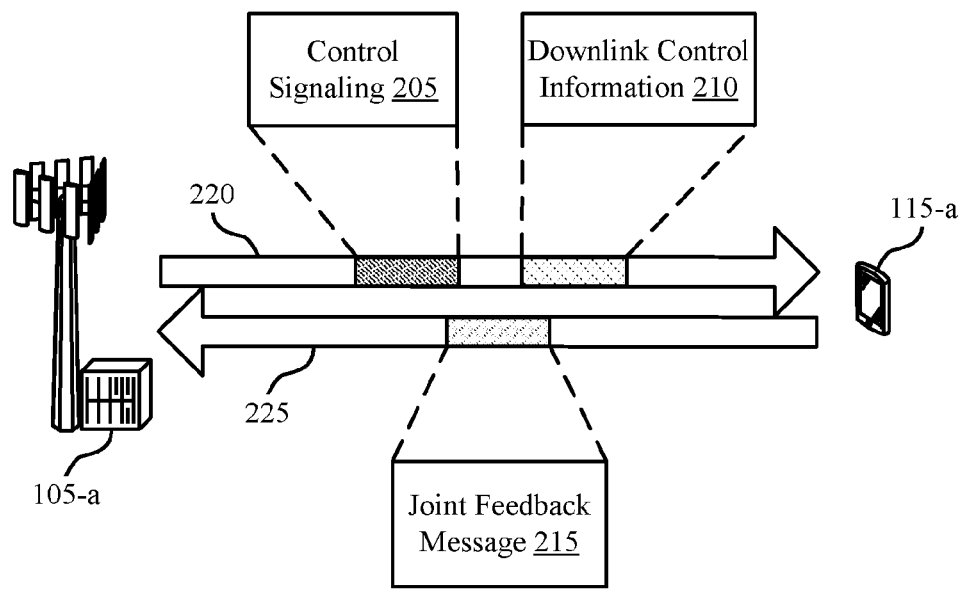
FIG. 2 illustrates an example of a wireless communications system that supports feedback for single-DCI to multi-cell scheduling in accordance with aspects of the present disclosure.

FIG. 2 illustrates an example of a wireless communications system 200 that supports feedback for single-DCI to multi-cell scheduling in accordance with aspects of the present disclosure. In some examples, wireless communications system 200 may implement aspects of wireless communication system 100. Wireless communications system 200 may include UE 115-a, which may be an example of a UE 115 as described with respect to FIG. 1. Wireless communications system 200 may also include a base station 105-a, which may be an example of a base station 105 as described with respect to FIG. 1.

Base station 105-a may transmit downlink messages to UE 115-a on downlink channel 220. UE 115-a may transmit uplink messages to base station 105-a on uplink channel 225. Base station 105-a may include a serving cell (SCell) that is a first CC, and a primary serving cell (P(S) Cell) that is a second CC.

Base station 105-a may transmit control signaling 205 to UE 115-a. Control signaling 205 may include a joint feedback configuration. The joint feedback configuration may indicate a configuration for reporting feedback for the downlink communications on the first CC, downlink communications on the second CC, and communication on a virtual CC. The virtual CC may be mapped to a third CC and a fourth CC (which may be the first CC and the second CC respectively, or may differ from the first and/or second CCs).

Base station 105-a may then transmit DCI 210 (e.g., a single) scheduling a first downlink transmission on the first CC (by the SCell) and a second downlink transmission on the second CC (by the P(S) Cell) (e.g., cross-carrier scheduling). The DCI 210 may also schedule the first downlink transmission and the second downlink transmission via the virtual CC.

UE 115-a may monitor the scheduled resources in order to attempt to receive the first and second downlink transmissions. UE 115-a may attempt to receive the first downlink transmission on the first CC, the second downlink transmission on the second CC, or both. In some cases, UE 115-a may also receive the first downlink transmission and the second downlink transmission as scheduled via the virtual CC that is mapped to actual CCs (e.g., receive the transmissions on the first CC and the second CC, or two other CCs, based on a mapping between the virtual CC and the actual CCs). Based on whether UE 115-a received the first and second downlink transmissions, and based on the success of decoding the received transmissions, UE 115-a may generate feedback information for the first and second downlink transmissions. The feedback information may be an ACK or NACK message. An ACK may indicate that UE 115-a successfully received and decoded data in the downlink transmissions. A NACK may indicate that UE 115-a was not able to successfully receive or decode the data in the downlink transmissions.

Based on control signaling 205 and the joint feedback configuration, UE 115-a may transmit a joint feedback message for the first CC, the second CC, and the virtual CC. The joint feedback message may be transmitted based on the joint feedback codebook configuration.

Figure 3:
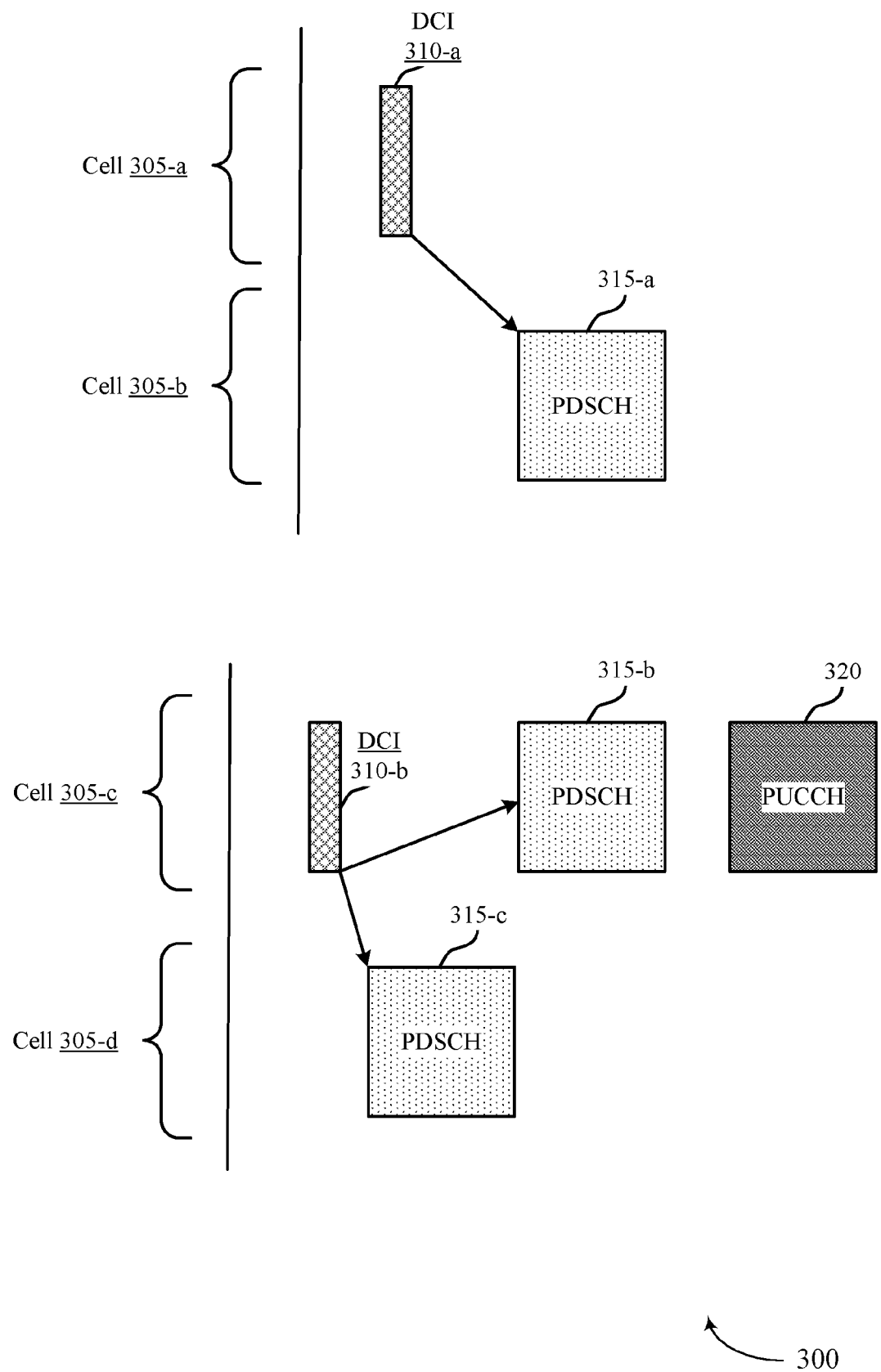
FIG. 3 illustrates an example of a cell schedule that supports feedback for single-DCI to multi-cell scheduling in accordance with aspects of the present disclosure.

FIG. 3 illustrates an example of a cell schedule 300 that supports feedback for single-DCI to multi-cell scheduling in accordance with aspects of the present disclosure. In some examples, cell schedule 300 may implement aspects of wireless communication systems 100 and 200. A UE 115 and a base station 105 may receive and transmit messages according to the resources scheduled in cell schedule 300.

In some cases, a base station 105 may transmit DCI on a first carrier that schedules a transmission on a second carrier, and is referred to as cross-carrier scheduling. For example, the base station 105 may transmit DCI 310-a on Cell 305-a that schedules a downlink transmission on another cell, such as cell 305-b. Cell 305-a may be an example of an SCell operating in a non-DSS configuration, and cell 305-b may be an example of a P(S) Cell operating in a DSS configuration.

In some cases, a base station 105 may transmit DCI on a first carrier that schedules a transmission on each of the first carrier and a second carrier, and is referred to as joint carrier scheduling. For example, cell 305-c may be an example of a SCell operating in a non-DSS configuration. The base station 105 may transmit DCI 310-b on cell 305-c, which may schedule a first PDSCH 315-b transmission on cell 305-c and also schedule a second PDSCH 315-c transmission on cell 305-d. Cell 305-d may be an example of a P(S) Cell operating in a DSS configuration.

A UE 115 may receive DCI 310-b via cell 305-c that schedules a PDSCH transmission on each of cell 305-c and 305-d. Based on receiving DCI 310-b, the UE 115 may monitor the scheduled resources for the PDSCH 315-b transmission on cell 305-c and also monitor for PDSCH 315-c transmission on cell 305-d. The UE 115 may then generate feedback information based on whether the UE 115 was able to successfully receive and decode PDSCH 315-b and 315-c. The feedback information (e.g., ACK/NACK information) may be transmitted by the UE 115 in PUCCH 320. In some cases, the CCs corresponding to cell 305-c and 305-d may be a virtual CC. The feedback information transmitted in PUCCH 320 may include feedback bits for both PDSCH 315-b and 315-c (e.g. a single ACK/NACK for PDSCH 315-b, and a single ACK/NACK bit for PDSCH 315-c). A base station 105 may receive PUCCH 320, and may determine whether the UE 115 successfully receive and decoded PDSCH 315-a and 315-b. The base station 105 may then retransmit any PDSCH transmission that was not successfully received.

Figure 4:
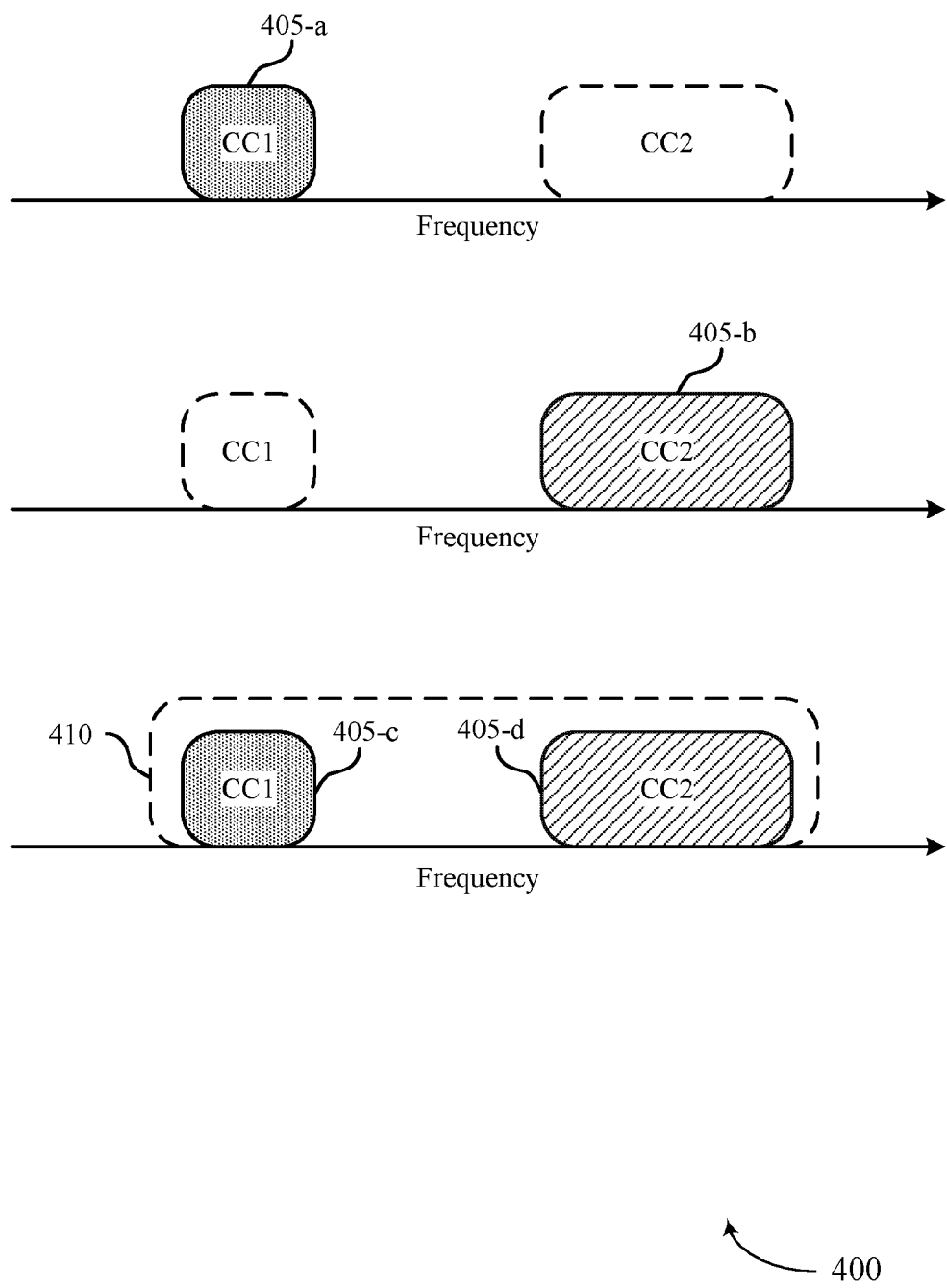
FIG. 4 illustrates an example of a carrier schedule that supports feedback for single-DCI to multi-cell scheduling in accordance with aspects of the present disclosure.

FIG. 4 illustrates an example of a carrier schedule 400 that supports feedback for single-DCI to multi-cell scheduling in accordance with aspects of the present disclosure. In some examples, carrier schedule 400 may implement aspects of wireless communication systems 100 and 200. A UE 115 and a base station 105 may communicate over one or more CCs 405.

A UE 115 and a base station may communicate over first CC 405-a. First CC 405-a may be used for communication over a first cell, such as a SCell. The UE 115 and the base station 105 may also communicate over a second CC 405-b. Second CC 405-b may be used for communication over a second cell, such as a P(S) Cell.

In a joint carrier configuration, the UE 115 may receive a single DCI on first CC 405-a or second CC 405-b from the base station 105, where the DCI schedules a first downlink transmission on first CC 405-a, and the same DCI may also schedule a second downlink transmission on CC 405-b. Or, the UE 115 may receive a single DCI on one CC scheduling transmissions on multiple CCs. In some examples, the base station 105 may configure the UE 115 with a virtual CC, which may be mapped to two or more actual CCs. The UE 115 may process the single DCI and the CCs on which the transmissions are scheduled on as a virtual CC 410. UE 115 may thus interpret the frequency band of virtual CC 410 as covering the same frequencies as CC 405-c and CC 405-d. The single DCI on virtual CC 410 may schedule a first downlink transmission and a second downlink transmission. The UE 115 may map the scheduled first downlink transmission and second downlink transmission to resources on third CC 405-d and on the fourth CC 405-d. In some examples, the third CC 405-c may be the same as the first CC 405-a, and the fourth CC 405-d may be the same as the second CC 405-d. Thus, the UE 115 may determine which resources and which CCs to monitor for the first and second downlink transmissions. In some cases, the same DCI may schedule transmission on first CC 405-a, second CC 405-b, and virtual CC 410. Further, in some cases, first CC 405-a may be the same as third CC 405-c, and second CC 405-b may be the same as fourth CC 405-d.

A UE 115 may receive control signaling from the base station 105 indicating a joint feedback codebook configuration for reporting feedback for the first CC 405-a, the second CC 405-b, and the virtual CC 410.

The UE 115 may use a joint feedback codebook configuration, which may be received in control signaling from the base station 105, to generate feedback for the first downlink transmission and second downlink transmission on the combination of first CC 405-a, second CC 405-b, and virtual CC 410. The feedback may indicate whether or not the UE 115 successfully received and decoded the downlink transmissions. The feedback information may be in the form of HARQ ACK/NACK feedback bits. ACK feedback bits may indicate that UE 115-a successfully received and decoded data in the downlink transmissions. NACK feedback bits may indicate that UE 115-a was not able to successfully receive or decode the data in the downlink transmissions. In some cases, the HARQ ACK/NACK feedback occasions may be semi-statically configured, and in other cases the HARQ ACK/NACK feedback occasions may be dynamically configured.

In cases where the ACK/NACK feedback occasions are semi-statically configured, there may be a different start and length indicator value (SLIV) table configurations for communications on CCs 405 and communications on virtual CC 410. The SLIV table may indicate a starting symbol relative to the start of the slot, and a number of consecutive symbols counting from symbol S that are allocated to the PDSCH transmission. There may also be different K1 configurations between CCs 405 and virtual CC 410. The K1 configuration may include timing information. Specifically, there may be a first SLIV table or K1 configuration for the PDSCH transmission scheduled by a DCI on CCs 405, and a second SLIV table or K1 configuration for PDSCH transmission scheduled by a DCI on virtual CC 410.

Based on the different SLIV tables of K1 configurations, the UE 115 may generate ACK/NACK bits for the PDSCH received on CCs 405-a and 405-b, that may be scheduled by a DCI for CCs 405-a and 405-b. The UE 115 may also generate ACK/NACK bits that may be scheduled by a DCI scheduling transmissions on the virtual CC 410.

The ACK/NACK bits for PDSCH occasions in CC 405-a and CC 405-b that may be scheduled by a DCI for virtual CC 410 may not be generated if the PDSCH occasions are duplicated with the PDSCH occasions in CC 405-a and 405-b that could be scheduled by DCIs for CC 405-a and 405-b.

In some cases, the UE 115 may not receive the DCI transmitted from the base station 105 scheduling the PDSCH occasions in CCs 405 and virtual CC 410. The PDSCH occasions may be partially or fully overlapping in time (e.g., duplicated). The UE 115 may still transmit feedback for each semi-statically configured PDSCH occasion. For example, when the UE 115 does not receive the DCI, even though transmitted by the base station 105, the UE 115 may not be aware of one or more scheduled downlink transmissions in one or more PDSCH occasions. In the semi-static configuration, the UE 115 may transmit a NACK feedback bit for any PDSCH occasion in which the UE 115 did not receive a PDCCH transmission scheduling the PDSCH in the occasion, or was unable to decode a scheduled PDSCH transmission. Thus, the UE 115 missing detection of a PDCCH scheduling a PDSCH transmission in a PDSCH occasion does not impact ACK/NACK feedback generation. Therefore, a base station 105 may be aware of whether to retransmit one or more downlink transmissions that the UE 115 did not receive.

In cases where the ACK/NACK feedback is dynamically configured, ACK/NACK bit generation may be based on a counter-downlink assignment index (C-DAI) that may be configured in the DCIs that a UE 115 receives from a base station 105. The base station may include a count value (e.g., the C-DAI) in each DCI. The count value may indicate the count of the DCI (e.g., how many DCIs have base station 105 has transmitted), such that the UE 115 may be aware of how many DCIs the UE 115 may have missed or not received correctly. Thus, the UE 115 may also be aware of how many downlink transmissions that the UE 115 missed, and may transmit a NACK for any transmission determined to be missing when a count value that is received in a DCI does not match a count maintained by UE 115.

In the DCI scheduling communications in virtual CC 410, the C-DAI may be incremented by a value of one or two depending on the count configuration. The count in the DCI may be incremented by one when the DCI is transmitted on the actual CCs, such as CC 405-a or CC 405-b. When the DCI is transmitted in the virtual CC 410, whether the C-DAI is incremented by one or two may depend on whether ACK/NACK bundling is configured for first CC 405-a and second CC 405-b. If ACK/NACK bundling is configured, the ACK/NACK bit for the CC 405-a may be bundled with the ACK/NACK bit for the second CC 405-b. The bundling may be an example of a logical AND operation to the multiple ACK/NACK bits to generate one ACK/NACK bit. For example, if either ACK/NACK bit for either CC 405-a or 405-b is a NACK, the bundled ACK/NACK bit may be a NACK (e.g., the UE 115 may perform a logical OR combination of each ACK/NACK bit)). If both bits are ACKs, the bit will be an ACK, and if both bits are NACKs, the bit will be a NACK. After the base station 105 receives the bundled ACK/NACK bit, base station 105 may retransmit both transmission, one on each CC, if a NACK. If the bundled ACK/NACK bit is an ACK, the base station 105 may schedule new transmissions.

The base station 105 may also increment the C-DAI bit by two (as the base station 105 has transmitted two downlink data transmissions, and the joint feedback is a single bit representing the success or failure of the two downlink transmissions). In cases where ACK/NACK bundling is not configured, the base station 105 may increment the C-DAI bit the a subsequent DCI by one, as the ACK/NACK bit that the base station 105 receives from the UE 115 represents the success or failure of one downlink transmission.

In some cases, whether the C-DAI is incremented by one bit or two bits may depend on whether the DCI schedules the PDSCHs on CC 405-a and CC 405-b, or schedules a PDSCH on either CC 405-a or CC 405-b. In cases where the base station 105 schedules the PDSCHs on CC 405-a and 405-b, the base station may increment the C-DAI bit in the subsequent DCI by two, as the base station 105 scheduled two transmissions. In cases where the base station 105 schedules the PDSCHS on either CC 405-a or CC 405-b, the base station 105 may increment the C-DAI bit in the subsequent DCI by one, as the base station 105 scheduled one transmissions.

In some cases, a UE 115 may receive multi-CC scheduling where a virtual CC is not configured, and may process multi-CC scheduling using a single DCI. In this case, a UE 115 may receive a single DCI that performs cross-carrier scheduling, and schedules CC 405-c and C 405-d, and the UE 115 may process this single DCI as two DCIs that schedule CC 405-c and CC 405-d, rather than a single DCI that schedules virtual CC 410. In these cases, the UE 115 may also configure HARQ ACK/NACK feedback semi-statically or dynamically. In the semi-static configuration, there may not be different SLIV table or K1 configurations between PDSCHs scheduled in CC 405-a or CC 405-c. There are also not different SLIV tables or K1 configurations between the PDSCHs scheduled in CC 405-b and 405-d. Thus, the SLIV table or K1 configuration is the same for CC 405-c as CC 405-a regardless of whether CC 405-c is scheduled individually or jointly with CC 405-d. The SLIV table or K1 configuration is the same for CC 405-d as CC 405-b, regardless of whether CC 405-d is scheduled individually or jointly with CC 405-c. The PDSCH occasions scheduled in any of CCs 405 may be configured based on the SLIV and K1 configuration of the CC 405.

The UE 115 may then generate ACK/NACK bits for PDSCH occasions in CC 405-c and CC 405-d, according to bandwidth part (BWP) configuration in CC 405-c and CC 405-d. In the dynamic configuration the UE 115 may generate ACK/NACK bits based on the C-DAI in the DCIs. In a DCI that schedules multiple CCs, the C-DAI may be incremented by one bit or two bits, depending on whether ACK/NACK bundling is configured for CC 405-c and CC 405-d, or depending on whether the DCI schedules PDSCHs on CC 405-c and CC 405-d, or schedules a PDSCH on either CC 405-c or CC 405-d.

Figure 5:
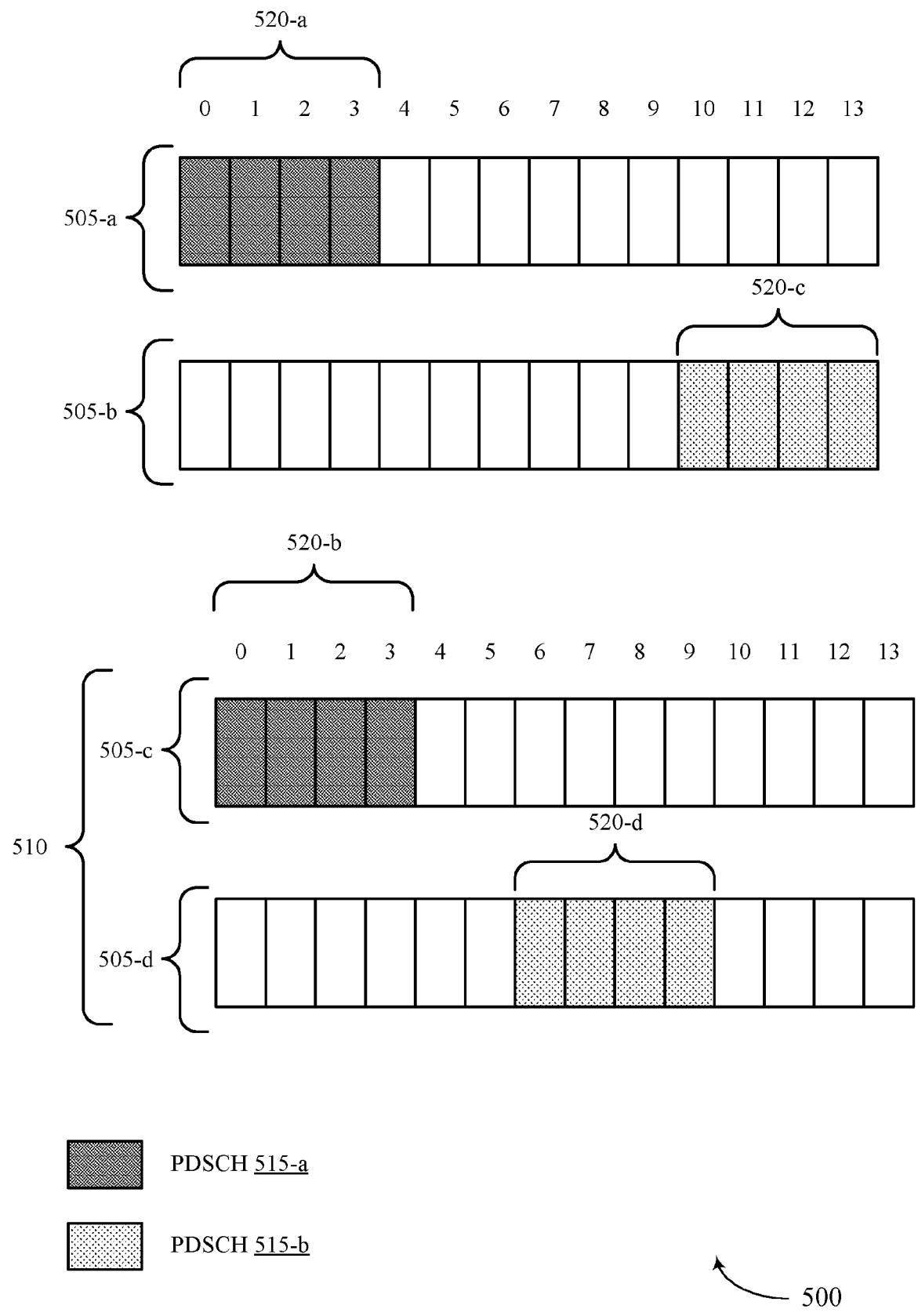
FIG. 5 illustrates an example of a slot diagram that supports feedback for single-DCI to multi-cell scheduling in accordance with aspects of the present disclosure.

FIG. 5 illustrates an example of a slot diagram 500 that supports feedback for single-DCI to multi-cell scheduling in accordance with aspects of the present disclosure. In some examples, slot diagram 500 may implement aspects of wireless communication systems 100 and 200. A UE 115 and a base station 105 may communicate according to the scheduling in slot diagram 500.

A UE 115 may receive multi-CC scheduling in a DCI. The UE 115 may process the multi-CC scheduling as if the multi-CC is a virtual CC. CC 505-a and CC 505-b may be example of separate CCs 505. CC 505-c and 505-d may be scheduled by a DCI, and the UE 115 may process the DCI scheduling CC 505-c and 505-d such that CCs 505-c and 505-d are virtual CC 510.

The DCI scheduling multi-CC configuration may schedule PDSCH 515-a occasions and PDSCH 515-b occasions. In a separate CC example, a UE 115 may receive a DCI that schedules PDSCH 515-a on CC 505-a. The UE 115 may also receive a DCI that schedules PDSCH 515-b on CC 505-b. In the virtual CC 510 case, the UE 115 may receive a DCI that schedules multiple CCs, and the CC may schedule PDSCH 515-a occasions on CC 505-c and may also schedule PDSCH 515-b occasions on CC 505-d. CCs 505-c and 505-d may be processed as part of virtual CC 510.

The UE 115 may then monitor the PDSCH 515-a and 515-b occasions, and generate ACK/NACK bits for each occasion based on monitoring the occasions. The PDSCH occasions 515-a and 515-b may be based on the SLIV table and K1 configuration of each CC 505. Each CC 505 may have different SLIV tables or K1 configurations, or both. The SLIV table may indicate a starting symbol relative to the start of the slot, and a number of consecutive symbols counting from symbol S that are allocated to the PDSCH 515. For example, CC 505-a may have a SLIV of {0, 4}, indicating that the starting symbol of PDSCH 515-a is symbol 0, and the duration of consecutive symbols is four symbols. The SLIV for PDSCH 515-a in CC 505-c may be the same, {0, 4}. Symbols 520-a of PDSCH 515-a in CC 505-a may be the same symbols for PDSCH 515-a in CC 505-a, within virtual CC 510. Thus, PDSCH occasions 520-a of the actual CC 505-a and the PDSCH occasion 520-b of CC 505-c of the virtual CC 510 may be the same PDSCH occasion, when CC 505-c is the same as CC 505-a. When the PDSCH occasions are the same between the actual and virtual CC, the UE 115 may report feedback data for one of the two PDSCH occasions in the joint feedback message. For example, the UE 115 may joint feedback message may include the same feedback data for PDSCH occasion 520-a and the PDSCH occasion 520-a, when CC 505-a and CC 505-c are the same CC, due to the PDSCH occasion 520-c and the PDSCH occasion 520-d corresponding to the same symbol periods. Thus, a single ACK/NACK bit may be used to provide feedback for PDSCH occasion 520-c and the PDSCH occasion 520-d that correspond to the same symbol periods of a same CC.

When the PDSCH occasions are different between the actual and virtual CC, the UE 115 may include separate feedback for each PDSCH occasion in the joint feedback message. In an example, the SLIV for PDSCH 515-b in CC 505-b may be {10, 4} (starting at symbol 10), and the SLIV for PDSCH 515-b in CC 505-d may be {6, 4} (starting at symbol 6). Thus, the PDSCH occasion 520-c on CC 505-c and the PDSCH occasion 520-d on CC 505-d of the virtual CC 510 differ. As such, the UE 115 may joint feedback data may include separate feedback data for PDSCH occasion 520-c and the PDSCH occasion 520-d, even if CC 505-b and CC 505-d are the same CC, due to the PDSCH occasion 520-c and the PDSCH occasion 520-d corresponding to different symbol periods.

The UE 115 may have previously received control signaling indicating a joint feedback configuration, for transmitting joint feedback for CC 505-a, 505-b, and virtual CC 510. In some cases, CC 505-a and 505-c are the same, and CC 505-b and 505-d may also be the same. The codebook may include configuration information for generating ACK/NACK its for PDSCH 515-a in CC 505-a, PDSCH 515-b in CC 505-b, and PDSCH 515-b in virtual CC 510. In this example, there may not be ACK/NACK bits configured for PDSCH 515-a in virtual CC 510, as the PDSCH 515-a in CC 505-c shares common symbols 520 with PDSCH 515-a of CC 505-a.

In cases where a single DCI schedules PDSCH 515 resources in multiple CCs 505 (e.g., in virtual CC 510), there may be corresponding PUCCH resources after PDSCH 515 resources, corresponding to an occasions for a UE 115 to transmit feedback information for the preceding PDSCH 515. A UE 115 may determine which PUCCH resource on which to transmit the joint feedback message, including the ACK/NACK feedback bits for PDSCHs 515. In some cases, the UE 115 may use the physical resource indicator (PRI) of the last DCI to determine which on which PUCCH resource to transmit the joint feedback (e.g., on the PUCCH resources after PDSCH 515-*a* or after PDSCH 515-*b*). The UE 115 may thus determine which DCI is the last DCI. The UE 115 may determine the last DCI based on an index of CCs 505.

In one case, the last DCI may be determined by whichever CC 505-*a*, 505-*b*, or virtual CC 510 has a lowest or highest index (based on a configuration of either lowest or highest index), where a PDSCH 515 is scheduled. In these cases, the PUCCH resource set configuration may be common across DCIs scheduling single CCs (e.g., scheduling CC 505-*a* and 505-*b*) and DCIs scheduling multi-CCs (e.g., CC 505-*c* and 505-*d* in virtual CC 510) so the UE 115 may use a common configuration that a base station 105 indicates to the UE 115 in control signaling. In these cases, a base station 105 may configure the UE 115 with a same PUCCH resource set configuration in cases of a single DCI scheduling resources in a single CC 505, and in cases of a single DCI scheduling resources in multiple CCs 505 (e.g., in virtual CC 510). The PUCCH resource set configuration may indicate a PUCCH resource on one of CCs 505 on which UE 115 may transmit the joint feedback for the multiple PDSCHs 515. The PUCCH resource set configuration may also indicate on which CC 505 UE 115 may transmit the joint feedback, where the selected CC 505 may be based on a particular scheduled PDSCH 515. For example, the PUCCH resource set configuration may indicate for UE 115 to transmit the joint feedback configuration on the CC 505 on which the most recent PDSCH 515 transmission occurred.

In other cases, the UE 115 may determine the last DCI based on whichever CC 505-*a* or 505-*b* has a highest index, where a PDSCH 515 is scheduled (e.g., ignoring the index of virtual CC 510). In these cases, the PUCCH resource set configuration may be different for single DCIs scheduling single CCs 505 and single DCIs scheduling multi-CCs 505 (e.g., in virtual CC 510). A base station 105 may configure the UE 115 with a first PUCCH resource set configuration in cases of single DCI to single CC 505 scheduling, and a second PUCCH resource set configuration in cases on single DCI to multiple CC 505 scheduling (e.g., for virtual CC 510). In the second PUCCH resource set configuration, there may be different PUCCH resources depending on whether the UE 115 is received in CC 505-*a* or 505-*b*, or in virtual CC 510. In this case, if the UE 115 receives a DCI scheduling PDSCH 515-*a* or 515-*b* on CC 505-*a* or 505-*b*, the PUCCH resource may be determined according to the first PUCCH resource set configuration for single DCI to single CC 505 scheduling (e.g., a previous higher layer configuration). This first PUCCH resource set configuration may indicate a PUCCH resource on CC 505-*a* or CC 505-*b* on which to transmit joint feedback information for one or more PDSCHs 515.

If the UE 115 receives a DCI scheduling PDSCH 515-*a* and 515-*b* on virtual CC 510, the UE 115 may determine the PUCCH resource according to the second PUCCH resource set configuration for single DCI to multiple CC 505 scheduling. This resource determination may be according to a higher layer configuration for virtual CC 510 scheduling. In these cases, the second PUCCH resource set configuration may indicate a PUCCH resource on CC 505-*c* or CC 505-*d* of the virtual CC 510, on which transmit the joint feedback information for one or more PDSCHs 515 received on virtual CC 510.

Thus, the UE 115 may determine the PUCCH resource for each of CC 505-*a*, CC 505-*b*, and virtual CC 510. Based on a success or failure of receiving and decoding each of PDSCHs 515, The UE 115 may transmit the joint feedback ACK/NACK bits (e.g., a joint feedback message) in the determined PUCCH resource. Thus, a base station transmitting PDSCHs 515 may determine whether UE 115 successfully received PDSCH 515, and a base station 105 may determine whether a retransmission process may be used for different PDSCH 515 messages.

Figure 6:
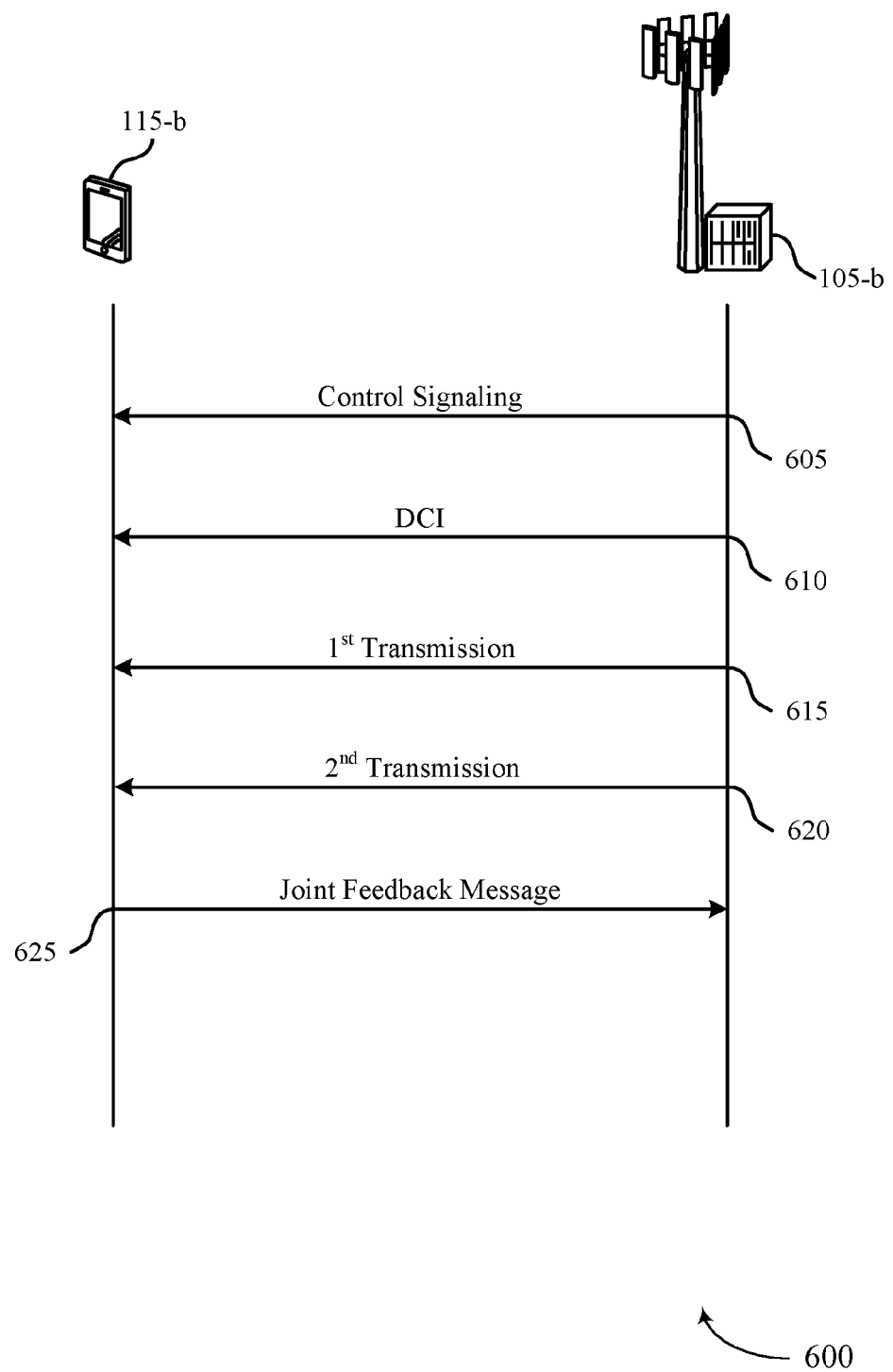
FIG. 6 illustrates an example of a process flow that supports feedback for single-DCI to multi-cell scheduling in accordance with aspects of the present disclosure.

FIG. 6 illustrates an example of a process flow 600 that supports feedback for single-DCI to multi-cell scheduling in accordance with aspects of the present disclosure. In some examples, process flow 600 may implement aspects of wireless communication systems 100 and 200. Process flow 600 may include UE 115-*b*, which may be an example of a UE 115 as described herein. Process flow 600 may also include base station 105-*b*, which may be an example of a base station 105 as described herein.

At 605, UE 115-*b* may receive control signaling indicating a joint feedback codebook configuration for jointly reporting feedback for a first CC, a second CC, and a virtual CC that may be mapped to a third CC and a fourth CC. In some cases, the first CC is the third CC, or the second CC and the fourth CC, or both. The control signaling may indicate the joint feedback codebook configuration, where the joint feedback codebook configuration is a semi-static joint feedback codebook configuration. The joint feedback codebook configuration may also be a dynamic joint feedback codebook configuration.

The control signaling may also indicate a first shared data channel occasion on the first CC, a second shared data channel occasion on the second CC, and a first virtual shared data channel occasion and a second virtual shared data channel occasion on the virtual CC. In cases where the first CC is the third CC, the second CC is the fourth CC, or both, the control signaling may include an indication that the first CC, the second CC, or both, has a different starting and length indicator value configuration than the third CC or the fourth CC, or both. In this case, the third CC and the fourth CC may belong to the virtual CC.

At 610, UE 115-*b* may receive DCI scheduling a first downlink transmission via the first CC and a second downlink transmission on the second CC. Or, the DCI may schedule the first downlink transmission and the second downlink transmission via the virtual CC.

UE 115-*b* may also receive a control channel resource configuration that is common across single DCI to single CC scheduling and single DCI to multiple CC scheduling. The joint feedback message transmitted at 615 may be transmitted in a control channel resource indicated in the control channel resource configuration. UE 115-*b* may receive a first control channel resource configuration for single DCI to single CC scheduling. UE 115-*b* may also receive a second control channel resource configuration for single DCI to multiple CC scheduling that may be different than the first CC resource configuration.

At 615, the UE 115-*b* may monitor for a first transmission as scheduled by the DCI on the first CC or the virtual CC. At 620, the UE 115-*b* may monitor for a second transmission as scheduled by the DCI on the second CC or the virtual CC.

At 625, UE 115-*b* may transmit a joint feedback message for the first CC, the second CC, and the virtual CC, based on the joint feedback configuration. UE 115-*b* may transmit the joint feedback message including feedback data for the first shared data channel occasion, the second shared data channel occasion, the first virtual shared data channel occasion, and the second virtual shared data channel occasion. UE 115-*b* may also transmit the joint feedback message including feedback data that includes one or two bits per CC.

Whether the feedback data includes one or two bits for each transmission on a CC may depend on a number of possible codewords. In some examples, for a CC configured with up to 4 layers, the feedback data for a single CC is one bit. For a CC configured with more than 4 layers, the feedback data for a single CC is two bits due to the number of codewords by MIMO operation. For semi-statically configured feedback, the feedback data may be for each of the first shared data channel occasion, the second shared data channel occasion, the first virtual shared data channel occasion, and the second virtual shared data channel occasion. In an example, the semi-statically configured feedback may include up to eight bits, one or two bits for the first shared data channel occasion, one or two bits for the second shared data channel occasion, one or two bits for the first virtual shared data channel occasion, and one or two bits for the second virtual shared data channel occasion.

The joint feedback message may also include feedback data that includes fewer than a single bit for each of the first shared data channel occasion, the second shared data channel occasion, the first virtual shared data channel occasion, and the second virtual shared data channel occasion. Whether the feedback data includes fewer than a single bit may be based on whether the first shared data channel occasion corresponds to a same resource as the first virtual shared data channel occasion, or the second shared data channel occasion corresponds to a same resource as the second virtual shared data channel occasion, or both.

UE 115-b may transmit the joint feedback message in a control channel resources indicated by the DCI, when the DCI is a latest receive DCI. Whether the DCI is the latest received DCI may be determined by a lowest or a highest index out of the first CC, the second CC, and the virtual CC. Or, the latest DCI may be determined based on a lowest or highest index out of the first CC and the second CC. Or, the latest DCI may be determined by a lowest index, or a highest index out of the first CC, the second CC, the third CC (belonging to the virtual CC), and the fourth CC (also belonging to the virtual CC).

UE 115-b may transmit the joint feedback message in a control channel resource configured for the first CC or the second CC in the second control channel resource configuration. Whether the joint feedback message is transmitted in the first CC or the second CC may be based on whether the DCI is received on a corresponding first CC or the second CC. UE 115-b may also transmit the joint feedback message in a control channel resource configured for the virtual CC in the second control channel resource configuration based on receiving the DCI on the virtual CC.

UE 115-b may transmit the joint feedback message with joint feedback data that is generated based on a counter value indicated in the DCI. A number by which the counter value is incremented to generate the joint feedback data may be based on the DCI scheduling the virtual CC, and also on whether feedback bundling is configured for the first CC and the second CC. The number by which the counter value is incremented to generate the joint feedback data may be based on the DCI scheduling the virtual CC, and also on the DCI schedules one or both of the first CC and the second CC.

Figure 7:
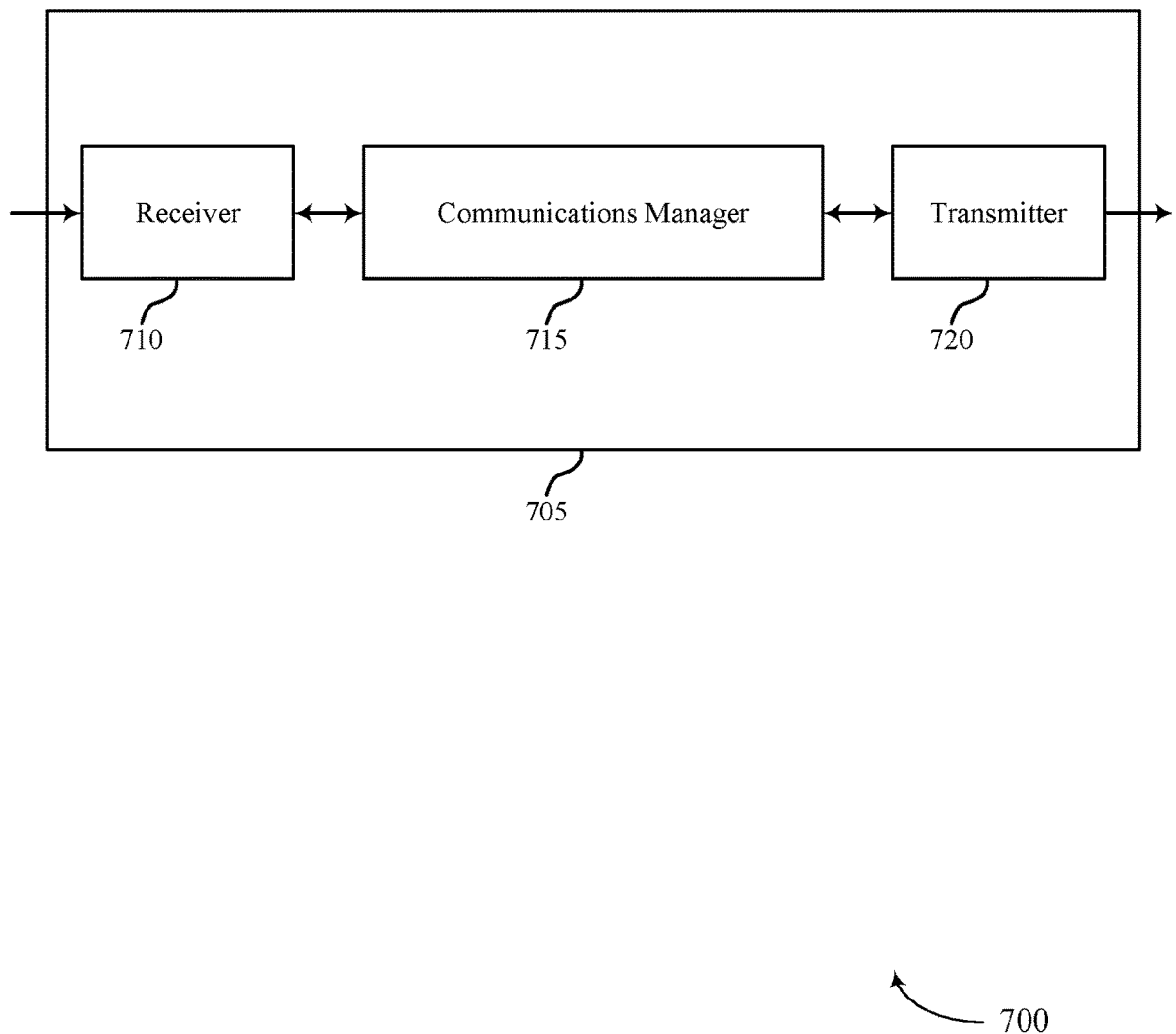
FIGS. 7 and 8 show block diagrams of devices that support feedback for single-DCI to multi-cell scheduling in accordance with aspects of the present disclosure.

FIG. 7 shows a block diagram 700 of a device 705 that supports feedback for single-DCI to multi-cell scheduling in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to feedback for single-DCI to multi-cell scheduling, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive control signaling indicating a joint feedback codebook configuration for jointly reporting feedback for a first CC, a second CC, and a virtual CC that is mapped to a third CC and a fourth CC, receive DCI scheduling a first downlink transmission via the first CC and a second downlink transmission on the second CC, or scheduling the first downlink transmission and the second downlink transmission via the virtual CC, and transmit a joint feedback message for the first CC, the second CC, and the virtual CC based on the joint feedback codebook configuration. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 described herein may be implemented as a chipset of a wireless modem, and the receiver 710 and the transmitter 570 may be implemented as sets of analog components (e.g., amplifiers, filters, phase shifters, antennas, etc.) The wireless modem may obtain and decode signals from the receiver 710 over a receive interface, and may output signals for transmission to the transmitter 720 over a transmit interface.

The actions performed by the communications manager 715 as described herein may be implemented to realize one or more potential advantages. One implementation may allow a UE 115 to save power and increase battery life by improving communications efficiency and providing further flexibility in feedback and communications opportunities by the UE 115. Another implementation may provide improved communications reliability by improving efficiency.

Figure 8:
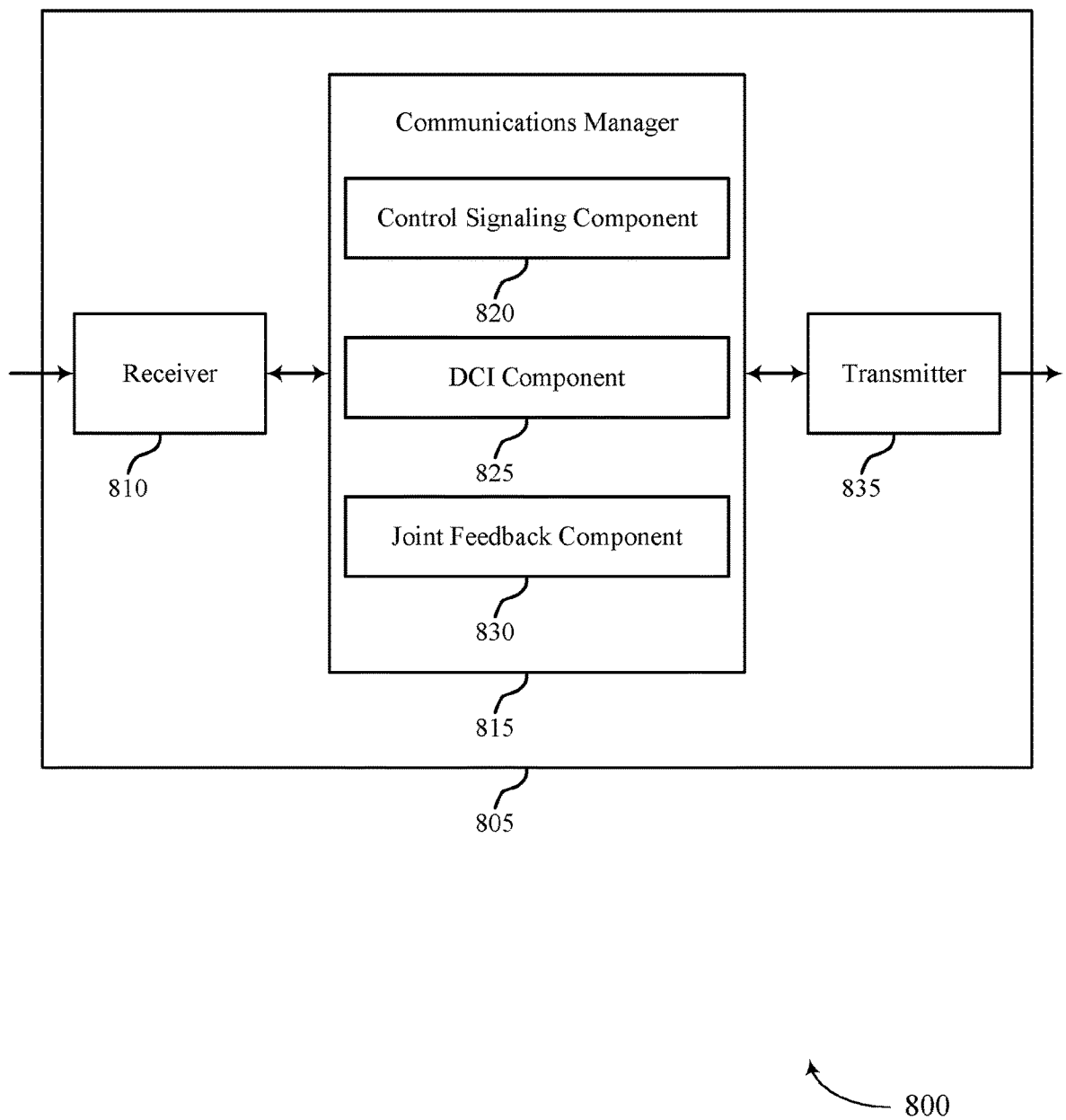

FIG. 8 shows a block diagram 800 of a device 805 that supports feedback for single-DCI to multi-cell scheduling in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to feedback for single-DCI to multi-cell scheduling, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a control signaling component 820, a DCI component 825, and a joint feedback component 830. The communications manager 815 may be an example of aspects of the communications manager 1010 described herein.

The control signaling component 820 may receive control signaling indicating a joint feedback codebook configuration for jointly reporting feedback for a first CC, a second CC, and a virtual CC that is mapped to a third CC and a fourth CC.

The DCI component 825 may receive DCI scheduling a first downlink transmission via the first CC and a second downlink transmission on the second CC, or scheduling the first downlink transmission and the second downlink transmission via the virtual CC.

The joint feedback component 830 may transmit a joint feedback message for the first CC, the second CC, and the virtual CC based on the joint feedback codebook configuration.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

A processor of a UE 115 (e.g., controlling the receiver 810, the transmitter 835, or the transceiver 1020 as described with reference to FIG. 10) may control the components described herein to realize one or more potential advantages. For example, the processor of the UE 115 may control the receiver 810 to receive control signaling indicating a joint feedback configuration for jointly reporting feedback for a first CC, a second CC, and a virtual CC. The processor of the UE 115 may also control the receiver 810 to receive DCI scheduling downlink transmissions on the first CC, second CC, and virtual CC, and also receive the downlink transmissions. The processor of the UE 115 may also control the transmitter 835 to transmit a joint feedback message the downlink transmissions monitored for on the first CC, the second CC, and the virtual CC. These operations may allow a UE 115 to efficiently utilize resources to transmitting joint feedback, thereby saving power and increasing battery life.

Figure 9:
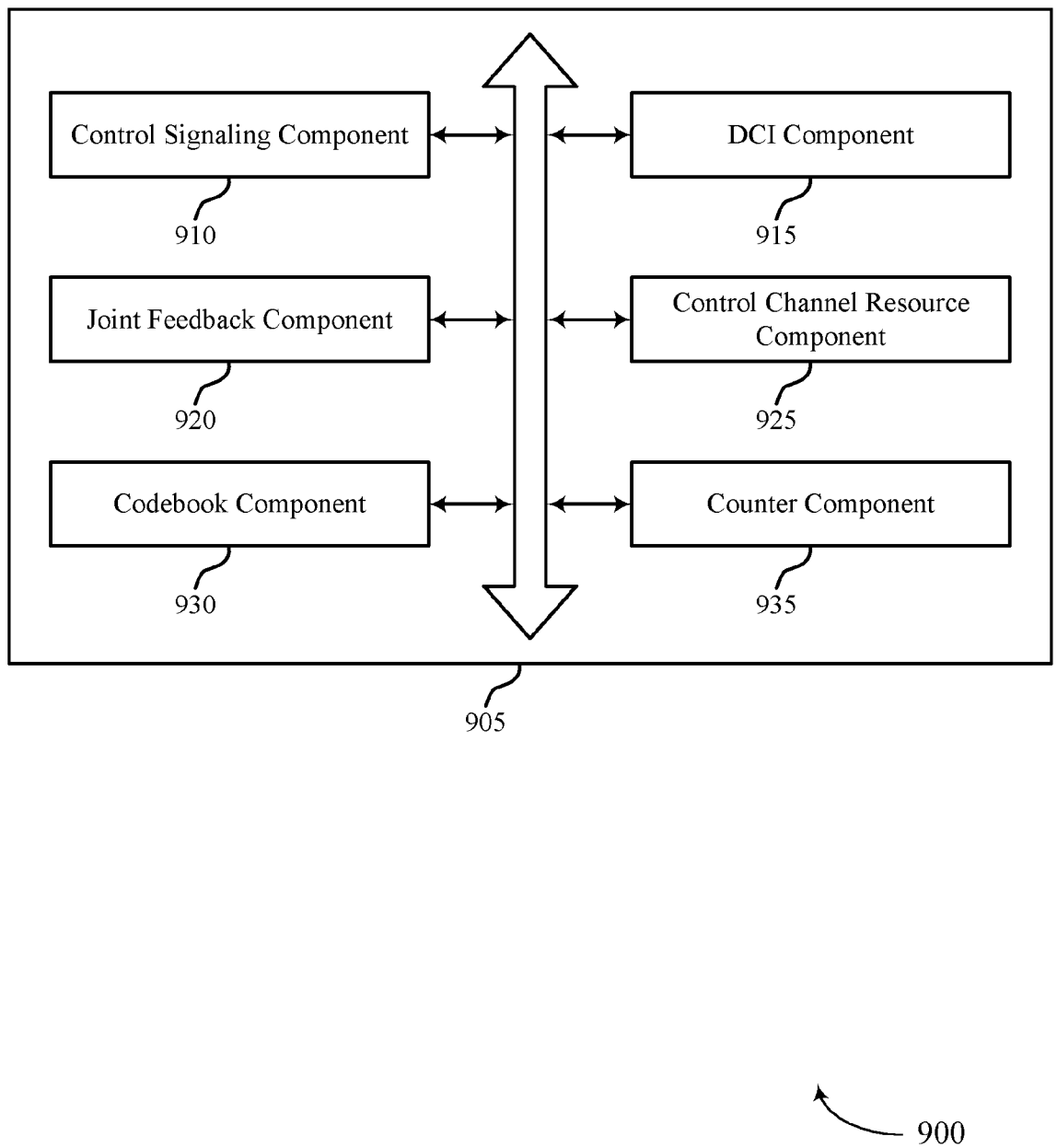
FIG. 9 shows a block diagram of a communications manager that supports feedback for single-DCI to multi-cell scheduling in accordance with aspects of the present disclosure.

FIG. 9 shows a block diagram 900 of a communications manager 905 that supports feedback for single-DCI to multi-cell scheduling in accordance with aspects of the present disclosure. The communications manager 905 may be an example of aspects of a communications manager 715, a communications manager 815, or a communications manager 1010 described herein. The communications manager 905 may include a control signaling component 910, a DCI component 915, a joint feedback component 920, a control channel resource component 925, a codebook component 930, and a counter component 935. Each of these modules may communicate, directly or indirectly, with one another (e.g., via one or more buses).

The control signaling component 910 may receive control signaling indicating a joint feedback codebook configuration for jointly reporting feedback for a first CC, a second CC, and a virtual CC that is mapped to a third CC and a fourth CC.

In some examples, the control signaling component 910 may receive the control signaling indicating the joint feedback codebook configuration that is a semi-static joint feedback codebook configuration.

In some examples, the control signaling component 910 may receive the control signaling that indicates a first shared data channel occasion on the first CC, a second shared data channel occasion on the second CC, and a first virtual shared data channel occasion and a second virtual shared data channel occasion on the virtual CC.

In some examples, the control signaling component 910 may receive the control signaling indicating that the first CC, the second CC, or both, has a different starting and length indicator value configuration than the third CC belonging to the virtual CC, the fourth CC belonging to the virtual CC, or both.

In some cases, the first CC is the third CC, the second CC is the fourth CC, or both.

The DCI component 915 may receive DCI scheduling a first downlink transmission via the first CC and a second downlink transmission on the second CC, or scheduling the first downlink transmission and the second downlink transmission via the virtual CC.

The joint feedback component 920 may transmit a joint feedback message for the first CC, the second CC, and the virtual CC based on the joint feedback codebook configuration.

In some examples, the joint feedback component 920 may transmit the joint feedback message including feedback data for the first shared data channel occasion, the second shared data channel occasion, the first virtual shared data channel occasion, and the second virtual shared data channel occasion.

In some examples, the joint feedback component 920 may transmit the joint feedback message including feedback data that includes one or two bits, depending on a number of possible codewords, for each of the first shared data channel occasion, the second shared data channel occasion, the first virtual shared data channel occasion, and the second virtual shared data channel occasion.

In some examples, the joint feedback component 920 may transmit the joint feedback message including feedback data that includes fewer than a single bit for each of the first shared data channel occasion, the second shared data channel occasion, the first virtual shared data channel occasion, and the second virtual shared data channel occasion, based on the first shared data channel occasion corresponding to a same resource as the first virtual shared data channel occasion, the second shared data channel occasion corresponding to a same resource as the second virtual shared data channel occasion, or both.

In some examples, the joint feedback component 920 may transmit the joint feedback message in a control channel resource indicated by the DCI that is a latest received DCI as determined by a lowest index or a highest index out of the first CC, the second CC, and the virtual CC.

In some examples, the joint feedback component 920 may transmit the joint feedback message in a control channel resource indicated by the DCI that is a latest received DCI as determined by a lowest index or a highest index out of the first CC and the second CC.

In some examples, the joint feedback component 920 may transmit the joint feedback message in a control channel resource indicated by the DCI that is a latest received DCI as determined by a lowest index or a highest index out of the first CC, the second CC, the third CC belonging to the virtual CC, and the fourth CC belonging to the virtual CC.

In some examples, the joint feedback component 920 may transmit the joint feedback message in a control channel resource configured for the first CC or the second CC in the second control channel resource configuration based on receiving the DCI on a corresponding one of the first CC or the second CC.

In some examples, the joint feedback component 920 may transmit the joint feedback message in a control channel resource configured for the virtual CC in the second control channel resource configuration based on receiving the DCI on the virtual CC.

The control channel resource component 925 may receive a control channel resource configuration that is common across single DCI to single CC scheduling and single DCI to multiple CC scheduling, where the joint feedback message is transmitted in a control channel resource indicated in the control channel resource configuration.

In some examples, the control channel resource component 925 may receive a first control channel resource configuration for single DCI to single CC scheduling.

In some examples, the control channel resource component 925 may receive a second control channel resource configuration for single DCI to multiple CC scheduling that is different than the first control channel resource configuration.

The codebook component 930 may receive the control signaling configuring the UE with the joint feedback codebook configuration that is a dynamic joint feedback codebook configuration.

The counter component 935 may transmit the joint feedback message having joint feedback data that is generated based on a counter value indicated in the DCI.

In some cases, a number by which the counter value is incremented to generate the joint feedback data is based on the DCI scheduling the virtual CC and whether feedback bundling is configured for the first CC and the second CC.

In some cases, a number by which the counter value is incremented to generate the joint feedback data is based on the DCI scheduling the virtual CC and whether the DCI schedules one or both of the first CC and the second CC.

Figure 10:
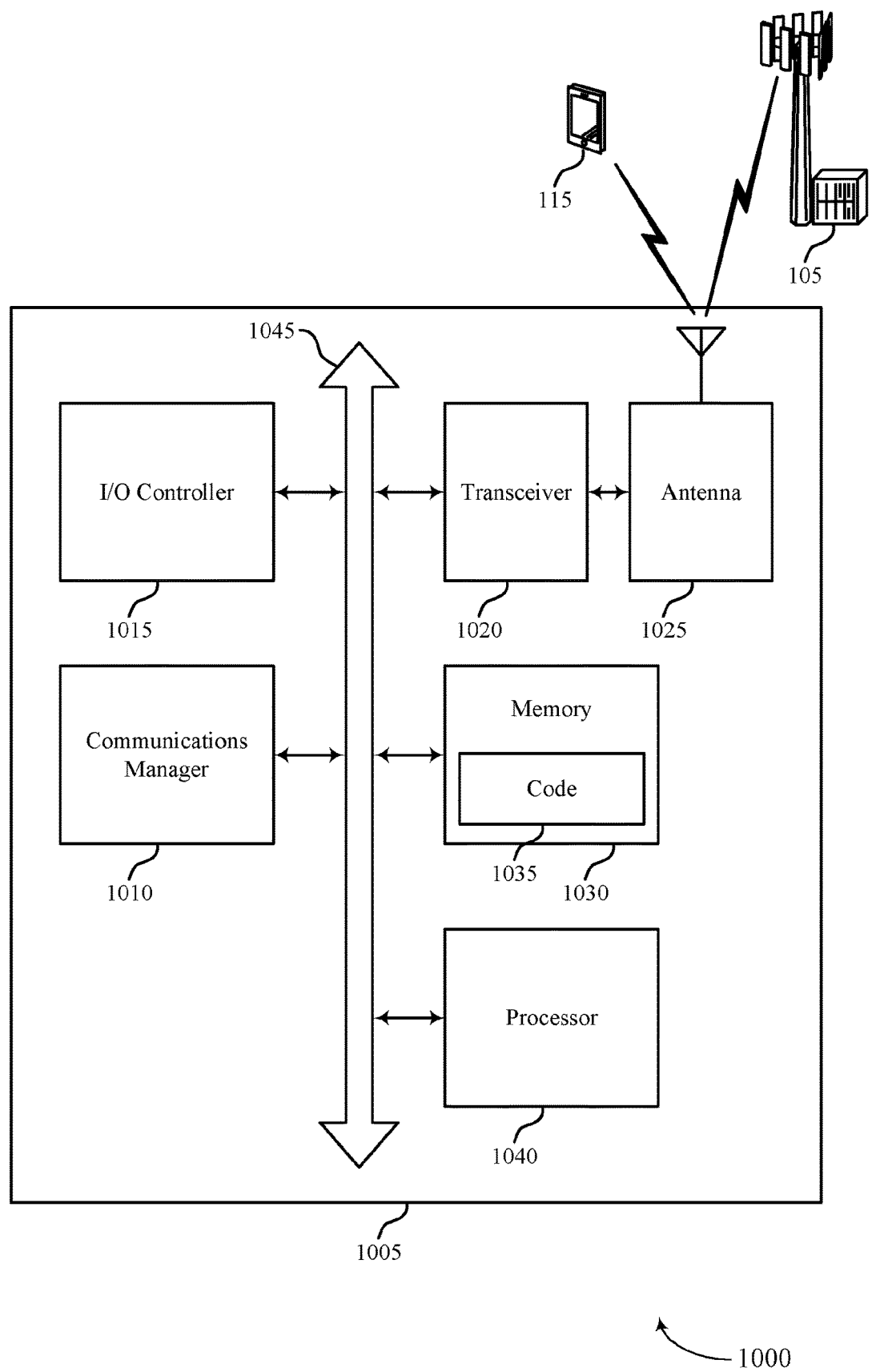
FIG. 10 shows a diagram of a system including a device that supports feedback for single-DCI to multi-cell scheduling in accordance with aspects of the present disclosure.

FIG. 10 shows a diagram of a system 1000 including a device 1005 that supports feedback for single-DCI to multi-cell scheduling in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive control signaling indicating a joint feedback codebook configuration for jointly reporting feedback for a first CC, a second CC, and a virtual CC that is mapped to a third CC and a fourth CC, receive DCI scheduling a first downlink transmission via the first CC and a second downlink transmission on the second CC, or scheduling the first downlink transmission and the second downlink transmission via the virtual CC, and transmit a joint feedback message for the first CC, the second CC, and the virtual CC based on the joint feedback codebook configuration.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting feedback for single-DCI to multi-cell scheduling).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
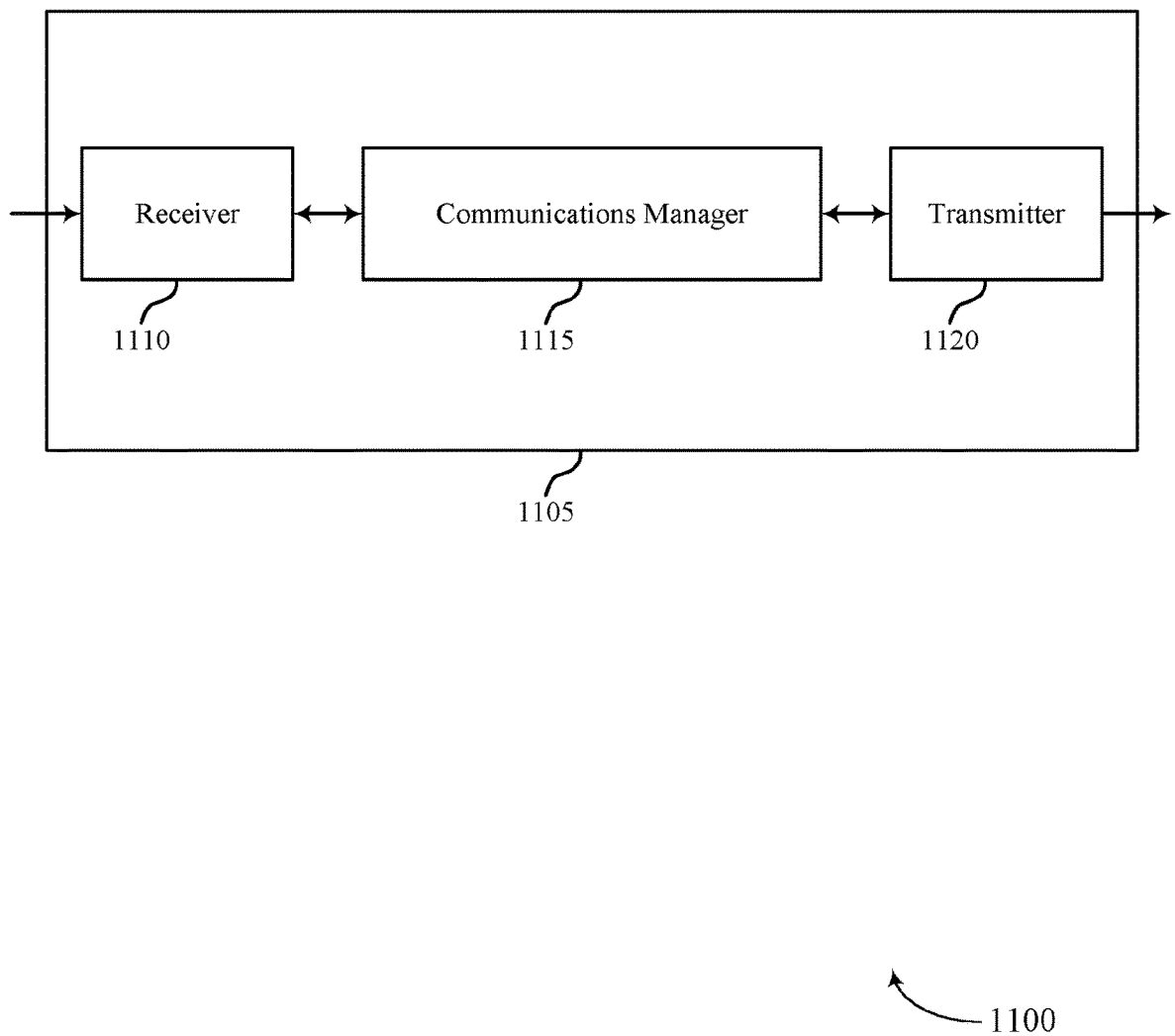
FIGS. 11 and 12 show block diagrams of devices that support feedback for single-DCI to multi-cell scheduling in accordance with aspects of the present disclosure.

FIG. 11 shows a block diagram 1100 of a device 1105 that supports feedback for single-DCI to multi-cell scheduling in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to feedback for single-DCI to multi-cell scheduling, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit control signaling indicating a joint feedback codebook configuration for jointly reporting feedback for a first CC, a second CC, and a virtual CC that is mapped to a third CC and a fourth CC, transmit DCI scheduling a first downlink transmission via the first CC and a second downlink transmission on the second CC, or scheduling the first downlink transmission and the second downlink transmission via the virtual CC, and receive a joint feedback message for the first CC, the second CC, and the virtual CC based on the joint feedback codebook configuration. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
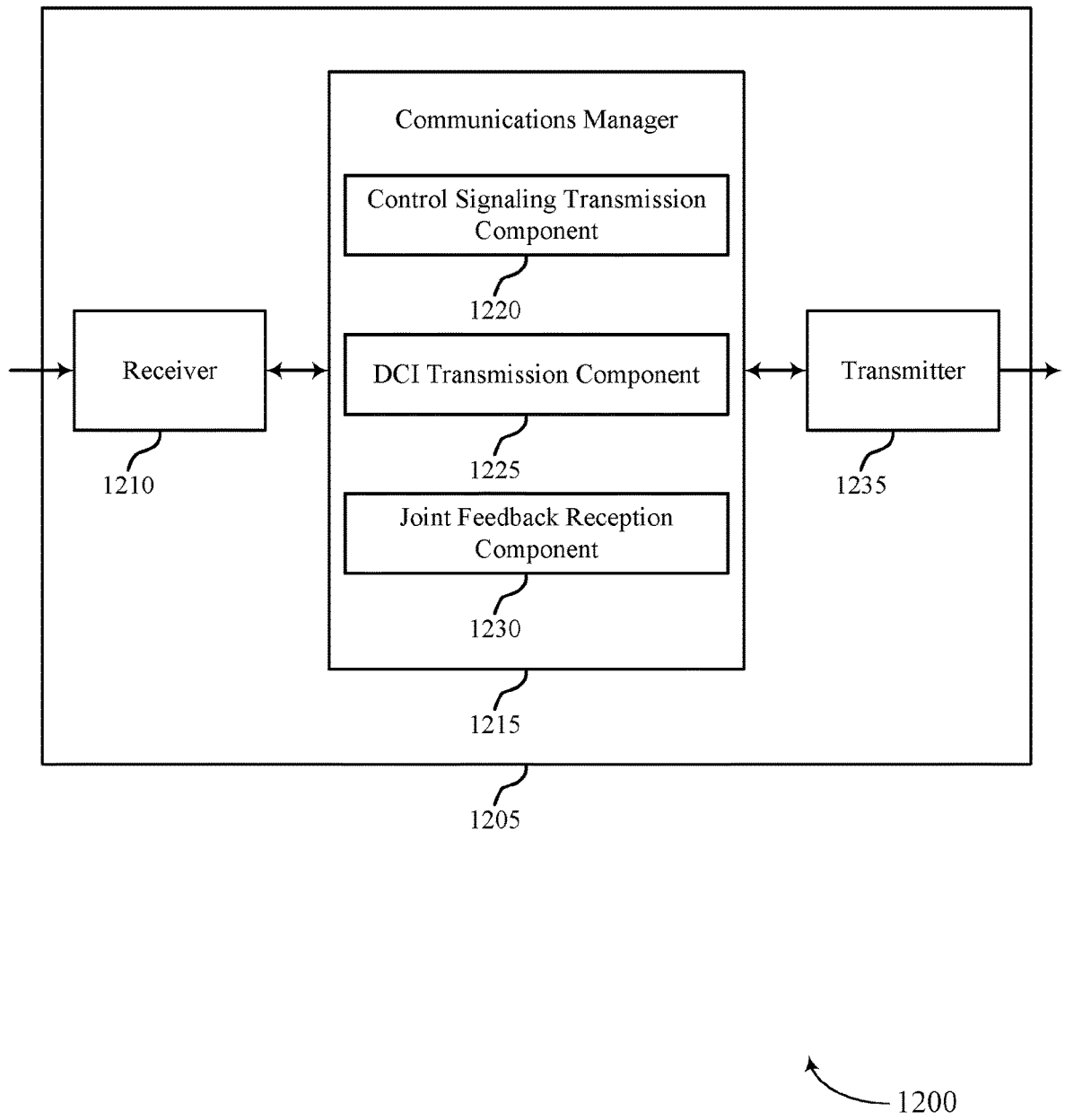

FIG. 12 shows a block diagram 1200 of a device 1205 that supports feedback for single-DCI to multi-cell scheduling in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to feedback for single-DCI to multi-cell scheduling, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a control signaling transmission component 1220, a DCI transmission component 1225, and a joint feedback reception component 1230. The communications manager 1215 may be an example of aspects of the communications manager 1410 described herein.

The control signaling transmission component 1220 may transmit control signaling indicating a joint feedback codebook configuration for jointly reporting feedback for a first CC, a second CC, and a virtual CC that is mapped to a third CC and a fourth CC.

The DCI transmission component 1225 may transmit DCI scheduling a first downlink transmission via the first CC and a second downlink transmission on the second CC, or scheduling the first downlink transmission and the second downlink transmission via the virtual CC.

The joint feedback reception component 1230 may receive a joint feedback message for the first CC, the second CC, and the virtual CC based on the joint feedback codebook configuration.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
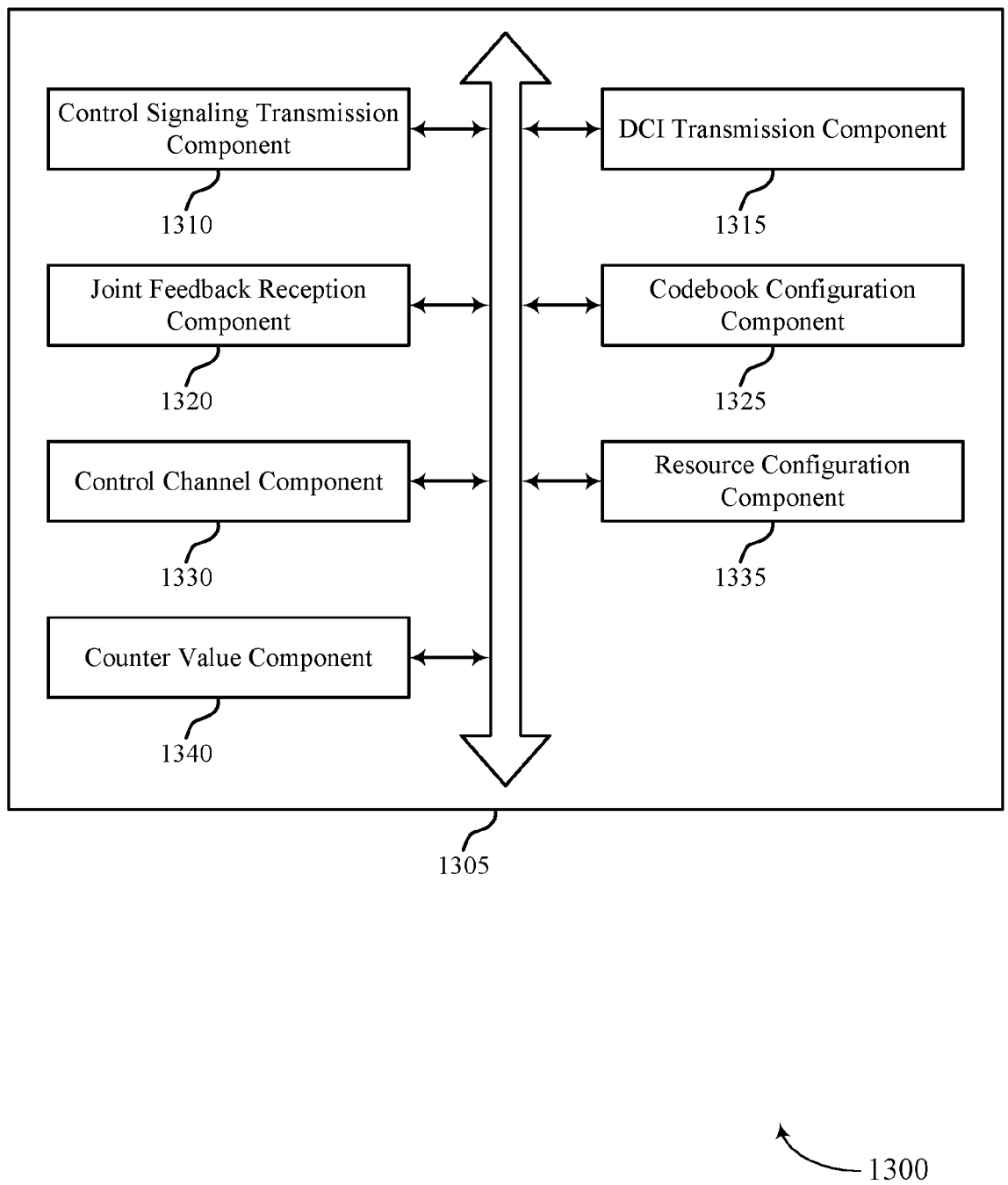
FIG. 13 shows a block diagram of a communications manager that supports feedback for single-DCI to multi-cell scheduling in accordance with aspects of the present disclosure.

FIG. 13 shows a block diagram 1300 of a communications manager 1305 that supports feedback for single-DCI to multi-cell scheduling in accordance with aspects of the present disclosure. The communications manager 1305 may be an example of aspects of a communications manager 1115, a communications manager 1215, or a communications manager 1410 described herein. The communications manager 1305 may include a control signaling transmission component 1310, a DCI transmission component 1315, a joint feedback reception component 1320, a codebook configuration component 1325, a control channel component 1330, a resource configuration component 1335, and a counter value component 1340. Each of these modules may communicate, directly or indirectly, with one another (e.g., via one or more buses).

The control signaling transmission component 1310 may transmit control signaling indicating a joint feedback codebook configuration for jointly reporting feedback for a first CC, a second CC, and a virtual CC that is mapped to a third CC and a fourth CC.

In some examples, the control signaling transmission component 1310 may transmit the control signaling that indicates a first shared data channel occasion on the first CC, a second shared data channel occasion on the second CC, and a first virtual shared data channel occasion and a second virtual shared data channel occasion on the virtual CC.

In some examples, the control signaling transmission component 1310 may transmit the control signaling indicating that the first CC, the second CC, or both, has a different starting and length indicator value configuration than the third CC belonging to the virtual CC, the fourth CC belonging to the virtual CC, or both.

In some examples, the control signaling transmission component 1310 may transmit the control signaling configuring a UE with the joint feedback codebook configuration that is a dynamic joint feedback codebook configuration.

In some cases, the first CC is the third CC, the second CC is the fourth CC, or both.

The DCI transmission component 1315 may transmit DCI scheduling a first downlink transmission via the first CC and a second downlink transmission on the second CC, or scheduling the first downlink transmission and the second downlink transmission via the virtual CC.

The joint feedback reception component 1320 may receive a joint feedback message for the first CC, the second CC, and the virtual CC based on the joint feedback codebook configuration.

In some examples, the joint feedback reception component 1320 may receive the joint feedback message including feedback data for the first shared data channel occasion, the second shared data channel occasion, the first virtual shared data channel occasion, and the second virtual shared data channel occasion.

In some examples, the joint feedback reception component 1320 may receive the joint feedback message including feedback data that includes one or two bits, depending on a number of possible codewords, for each of the first shared data channel occasion, the second shared data channel occasion, the first virtual shared data channel occasion, and the second virtual shared data channel occasion.

In some examples, the joint feedback reception component 1320 may receive the joint feedback message including feedback data that includes fewer than a single bit for each of the first shared data channel occasion, the second shared data channel occasion, the first virtual shared data channel occasion, and the second virtual shared data channel occasion, based on the first shared data channel occasion corresponding to a same resource as the first virtual shared data channel occasion, the second shared data channel occasion corresponding to a same resource as the second virtual shared data channel occasion, or both.

In some examples, the joint feedback reception component 1320 may receive the joint feedback message in a control channel resource configured for the first CC or the second CC in the second control channel resource configuration based on receiving the DCI on a corresponding one of the first CC or the second CC.

In some examples, the joint feedback reception component 1320 may receive the joint feedback message in a control channel resource configured for the virtual CC in the second control channel resource configuration based on receiving the DCI on the virtual CC.

The codebook configuration component 1325 may transmit the control signaling indicating the joint feedback codebook configuration that is a semi-static joint feedback codebook configuration.

The control channel component 1330 may receive the joint feedback message in a control channel resource indicated by the DCI that is a latest received DCI as determined by a lowest index or a highest index out of the first CC, the second CC, and the virtual CC.

In some examples, the control channel component 1330 may receive the joint feedback message in a control channel resource indicated by the DCI that is a latest received DCI as determined by a lowest index or a highest index out of the first CC and the second CC.

In some examples, the control channel component 1330 may receive the joint feedback message in a control channel resource indicated by the DCI that is a latest received DCI as determined by a lowest index or a highest index out of the first CC, the second CC, the third CC belonging to the virtual CC, and the fourth CC belonging to the virtual CC.

The resource configuration component 1335 may transmit a control channel resource configuration that is common across single DCI to single CC scheduling and single DCI to multiple CC scheduling, where the joint feedback message is transmitted in a control channel resource indicated in the control channel resource configuration.

In some examples, the resource configuration component 1335 may transmit a first control channel resource configuration for single DCI to single CC scheduling.

In some examples, the resource configuration component 1335 may transmit a second control channel resource configuration for single DCI to multiple CC scheduling that is different than the first control channel resource configuration.

The counter value component 1340 may receive the joint feedback message having joint feedback data that is generated based on a counter value indicated in the DCI.

In some cases, a number by which the counter value is incremented to generate the joint feedback data is based on the DCI scheduling the virtual CC and whether feedback bundling is configured for the first CC and the second CC.

In some cases, a number by which the counter value is incremented to generate the joint feedback data is based on the DCI scheduling the virtual CC and whether the DCI schedules one or both of the first CC and the second CC.

Figure 14:
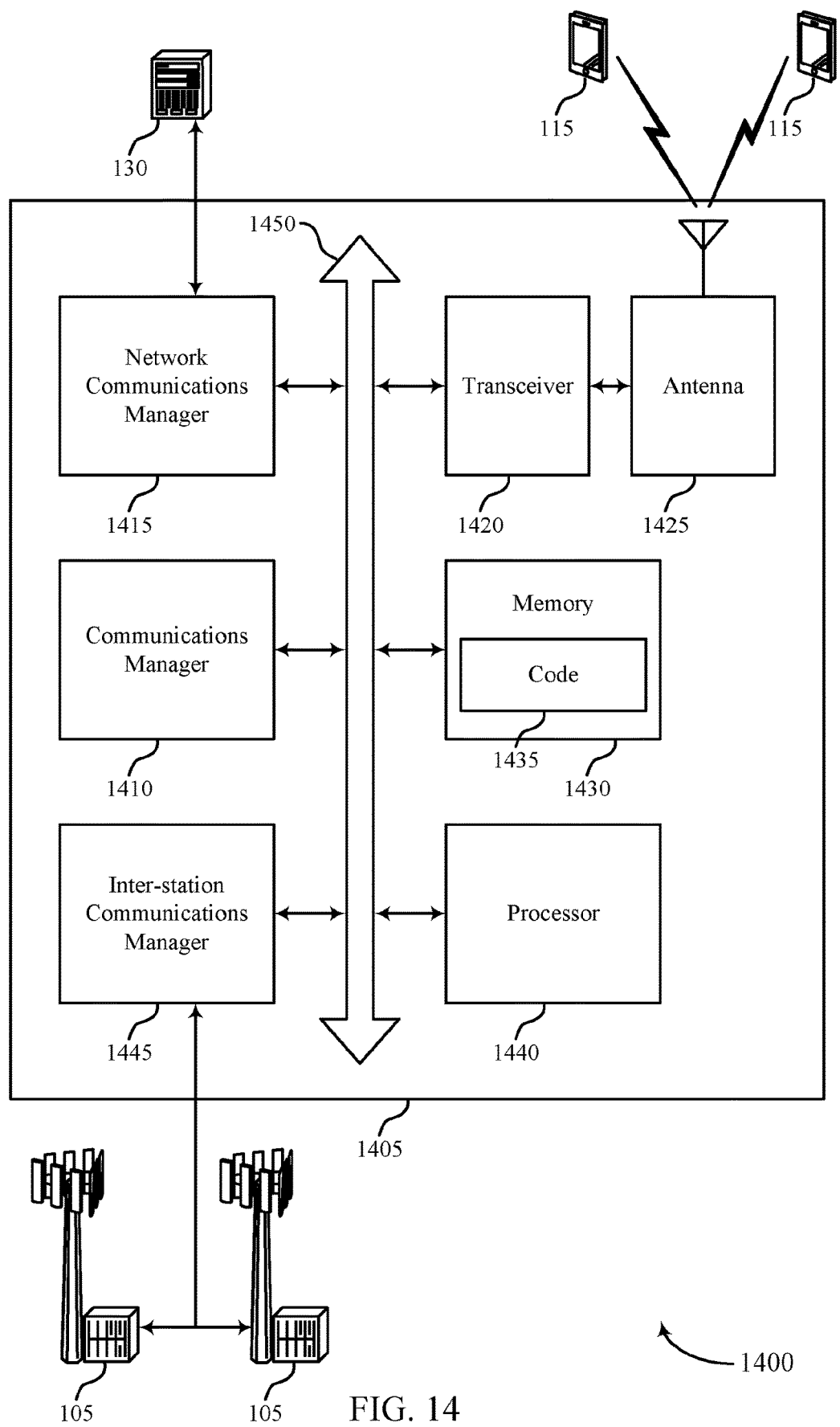
FIG. 14 shows a diagram of a system including a device that supports feedback for single-DCI to multi-cell scheduling in accordance with aspects of the present disclosure.

FIG. 14 shows a diagram of a system 1400 including a device 1405 that supports feedback for single-DCI to multi-cell scheduling in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit control signaling indicating a joint feedback codebook configuration for jointly reporting feedback for a first CC, a second CC, and a virtual CC that is mapped to a third CC and a fourth CC, transmit DCI scheduling a first downlink transmission via the first CC and a second downlink transmission on the second CC, or scheduling the first downlink transmission and the second downlink transmission via the virtual CC, and receive a joint feedback message for the first CC, the second CC, and the virtual CC based on the joint feedback codebook configuration.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting feedback for single-DCI to multi-cell scheduling).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
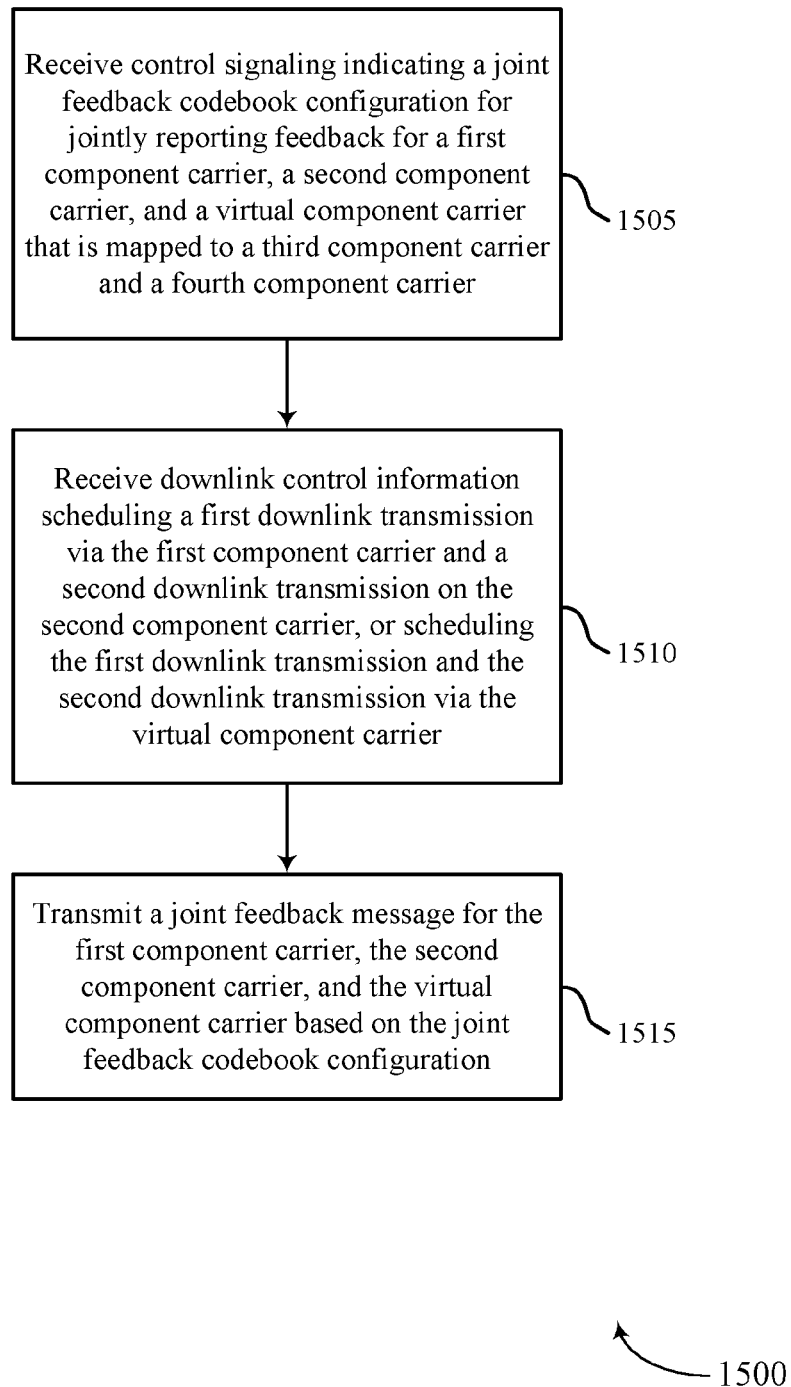
FIGS. 15 through 18 show flowcharts illustrating methods that support feedback for single-DCI to multi-cell scheduling in accordance with aspects of the present disclosure.

FIG. 15 shows a flowchart illustrating a method 1500 that supports feedback for single-DCI to multi-cell scheduling in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive control signaling indicating a joint feedback codebook configuration for jointly reporting feedback for a first CC, a second CC, and a virtual CC that is mapped to a third CC and a fourth CC. The operations of 1505 may be performed according to the methods described herein. In some examples, aspects of the operations of 1505 may be performed by a control signaling component as described with reference to FIGS. 7 through 10.

At 1510, the UE may receive DCI scheduling a first downlink transmission via the first CC and a second downlink transmission on the second CC, or scheduling the first downlink transmission and the second downlink transmission via the virtual CC. The operations of 1510 may be performed according to the methods described herein. In some examples, aspects of the operations of 1510 may be performed by a DCI component as described with reference to FIGS. 7 through 10.

At 1515, the UE may transmit a joint feedback message for the first CC, the second CC, and the virtual CC based on the joint feedback codebook configuration. The operations of 1515 may be performed according to the methods described herein. In some examples, aspects of the operations of 1515 may be performed by a joint feedback component as described with reference to FIGS. 7 through 10.

Figure 16:
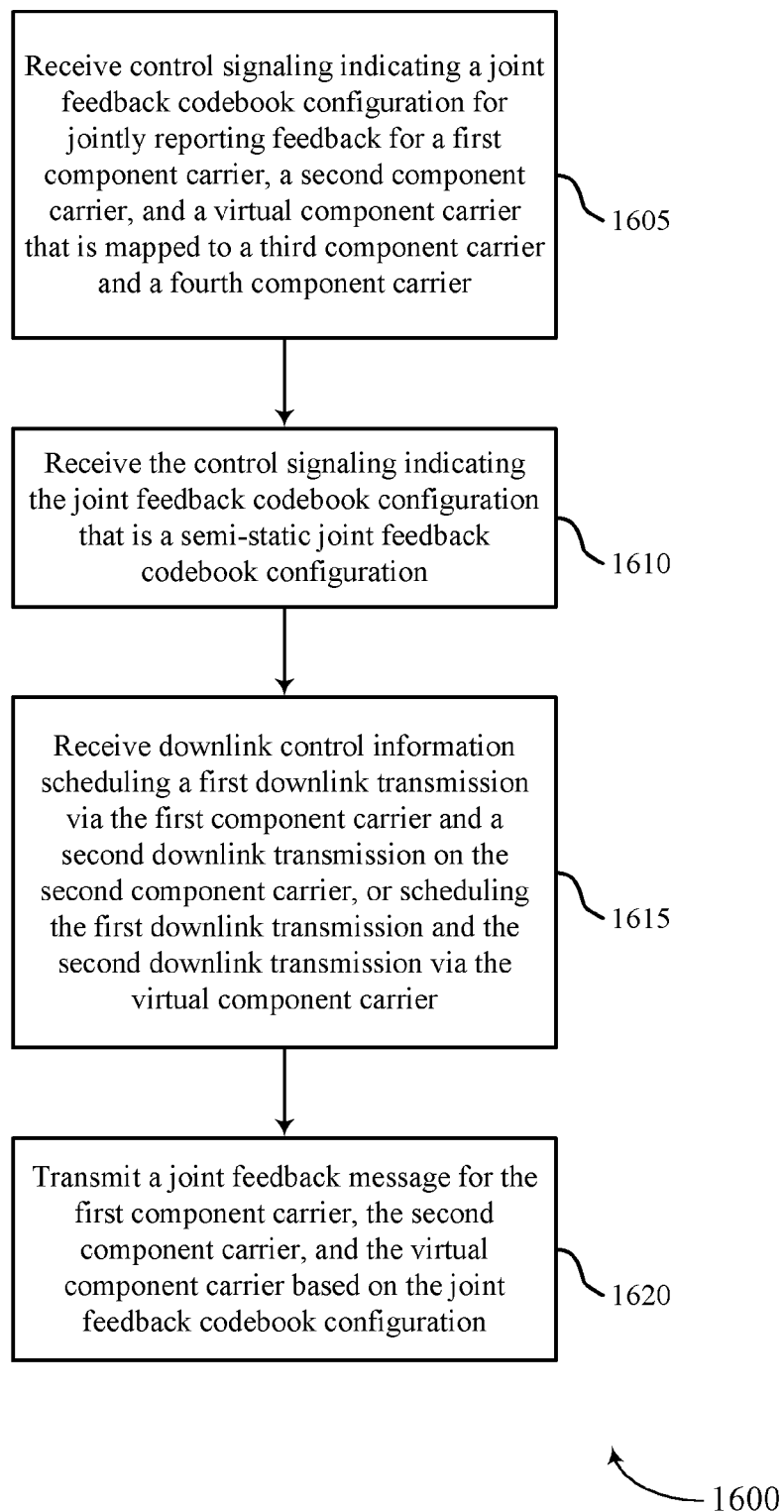

FIG. 16 shows a flowchart illustrating a method 1600 that supports feedback for single-DCI to multi-cell scheduling in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive control signaling indicating a joint feedback codebook configuration for jointly reporting feedback for a first CC, a second CC, and a virtual CC that is mapped to a third CC and a fourth CC. The operations of 1605 may be performed according to the methods described herein. In some examples, aspects of the operations of 1605 may be performed by a control signaling component as described with reference to FIGS. 7 through 10.

At 1610, the UE may receive the control signaling indicating the joint feedback codebook configuration that is a semi-static joint feedback codebook configuration. The operations of 1610 may be performed according to the methods described herein. In some examples, aspects of the operations of 1610 may be performed by a control signaling component as described with reference to FIGS. 7 through 10.

At 1615, the UE may receive DCI scheduling a first downlink transmission via the first CC and a second downlink transmission on the second CC, or scheduling the first downlink transmission and the second downlink transmission via the virtual CC. The operations of 1615 may be performed according to the methods described herein. In some examples, aspects of the operations of 1615 may be performed by a DCI component as described with reference to FIGS. 7 through 10.

At 1620, the UE may transmit a joint feedback message for the first CC, the second CC, and the virtual CC based on the joint feedback codebook configuration. The operations of 1620 may be performed according to the methods described herein. In some examples, aspects of the operations of 1620 may be performed by a joint feedback component as described with reference to FIGS. 7 through 10.

Figure 17:
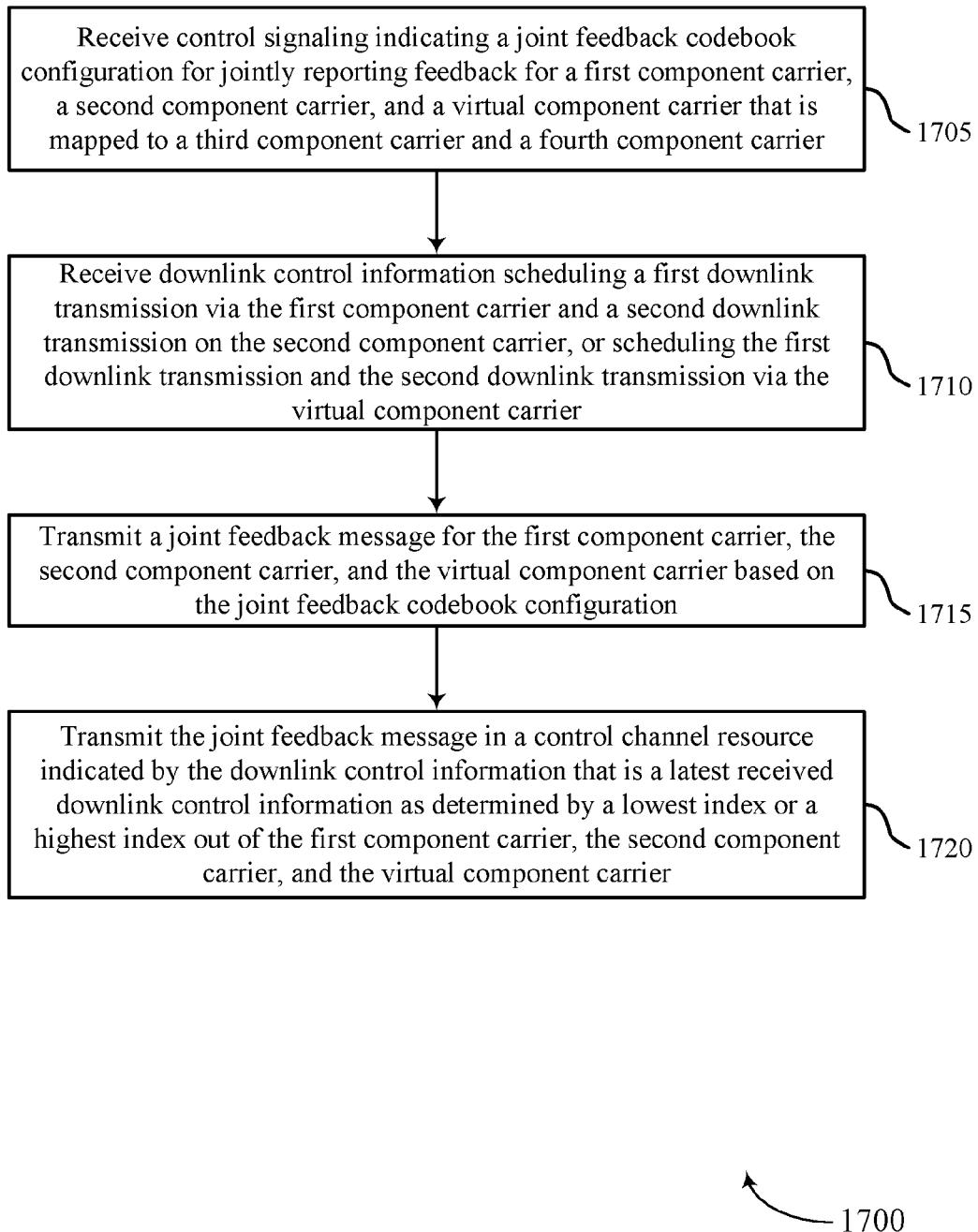

FIG. 17 shows a flowchart illustrating a method 1700 that supports feedback for single-DCI to multi-cell scheduling in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive control signaling indicating a joint feedback codebook configuration for jointly reporting feedback for a first CC, a second CC, and a virtual CC that is mapped to a third CC and a fourth CC. The operations of 1705 may be performed according to the methods described herein. In some examples, aspects of the operations of 1705 may be performed by a control signaling component as described with reference to FIGS. 7 through 10.

At 1710, the UE may receive DCI scheduling a first downlink transmission via the first CC and a second downlink transmission on the second CC, or scheduling the first downlink transmission and the second downlink transmission via the virtual CC. The operations of 1710 may be performed according to the methods described herein. In some examples, aspects of the operations of 1710 may be performed by a DCI component as described with reference to FIGS. 7 through 10.

At 1715, the UE may transmit a joint feedback message for the first CC, the second CC, and the virtual CC based on the joint feedback codebook configuration. The operations of 1715 may be performed according to the methods described herein. In some examples, aspects of the operations of 1715 may be performed by a joint feedback component as described with reference to FIGS. 7 through 10.

At 1720, the UE may transmit the joint feedback message in a control channel resource indicated by the DCI that is a latest received DCI as determined by a lowest index or a highest index out of the first CC, the second CC, and the virtual CC. The operations of 1720 may be performed according to the methods described herein. In some examples, aspects of the operations of 1720 may be performed by a joint feedback component as described with reference to FIGS. 7 through 10.

Figure 18:
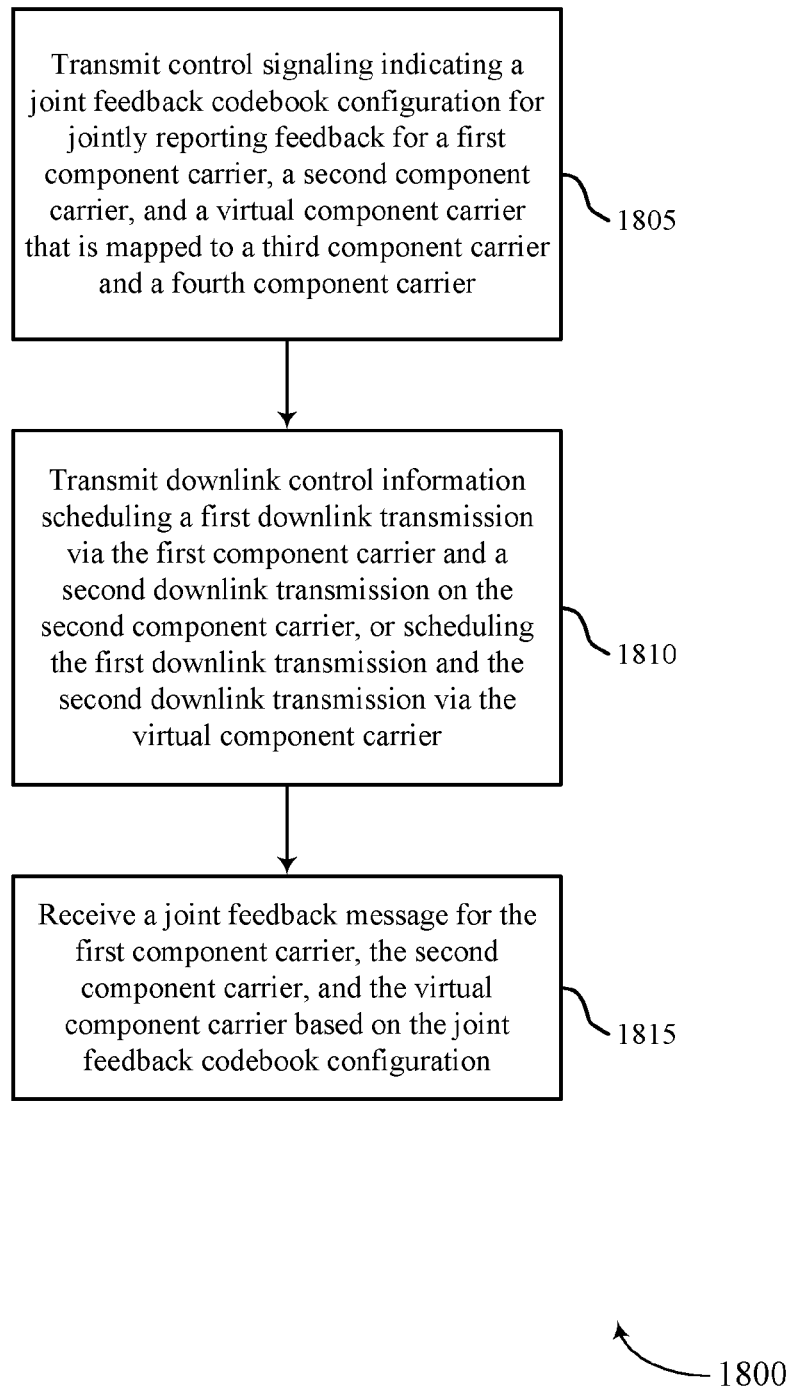

FIG. 18 shows a flowchart illustrating a method 1800 that supports feedback for single-DCI to multi-cell scheduling in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit control signaling indicating a joint feedback codebook configuration for jointly reporting feedback for a first CC, a second CC, and a virtual CC that is mapped to a third CC and a fourth CC. The operations of 1805 may be performed according to the methods described herein. In some examples, aspects of the operations of 1805 may be performed by a control signaling transmission component as described with reference to FIGS. 11 through 14.

At 1810, the base station may transmit DCI scheduling a first downlink transmission via the first CC and a second downlink transmission on the second CC, or scheduling the first downlink transmission and the second downlink transmission via the virtual CC. The operations of 1810 may be performed according to the methods described herein. In some examples, aspects of the operations of 1810 may be performed by a DCI transmission component as described with reference to FIGS. 11 through 14.

At 1815, the base station may receive a joint feedback message for the first CC, the second CC, and the virtual CC based on the joint feedback codebook configuration. The operations of 1815 may be performed according to the methods described herein. In some examples, aspects of the operations of 1815 may be performed by a joint feedback reception component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   receiving control signaling indicating a joint feedback codebook configuration for jointly reporting feedback for a first component carrier, a second component carrier, and a virtual component carrier that is mapped to a third component carrier and a fourth component carrier;
   receiving downlink control information scheduling a first downlink transmission via the first component carrier and a second downlink transmission on the second component carrier, or scheduling the first downlink transmission and the second downlink transmission via the virtual component carrier; and
   transmitting a joint feedback message for the first component carrier, the second component carrier, and the virtual component carrier based at least in part on the joint feedback codebook configuration.

2. The method of claim 1, wherein receiving the control signaling comprises:
   receiving the control signaling indicating the joint feedback codebook configuration that is a semi-static joint feedback codebook configuration.

3. The method of claim 2, wherein receiving the control signaling comprises:
   receiving the control signaling that indicates a first shared data channel occasion on the first component carrier, a second shared data channel occasion on the second component carrier, and a first virtual shared data channel occasion and a second virtual shared data channel occasion on the virtual component carrier.

4. The method of claim 3, wherein transmitting the joint feedback message comprises:
   transmitting the joint feedback message comprising feedback data for the first shared data channel occasion, the second shared data channel occasion, the first virtual shared data channel occasion, and the second virtual shared data channel occasion.

5. The method of claim 4, wherein transmitting the joint feedback message comprises:
transmitting the joint feedback message comprising feedback data that includes one or two bits, depending on a number of possible codewords, for each of the first shared data channel occasion, the second shared data channel occasion, the first virtual shared data channel occasion, and the second virtual shared data channel occasion.

6. The method of claim 4, wherein the first component carrier is the third component carrier, the second component carrier is the fourth component carrier, or both, and wherein transmitting the joint feedback message comprises:
transmitting the joint feedback message comprising feedback data that includes fewer than a single bit for each of the first shared data channel occasion, the second shared data channel occasion, the first virtual shared data channel occasion, and the second virtual shared data channel occasion, based at least in part on the first shared data channel occasion corresponding to a same resource as the first virtual shared data channel occasion, the second shared data channel occasion corresponding to a same resource as the second virtual shared data channel occasion, or both.

7. The method of claim 1, wherein the first component carrier is the third component carrier, the second component carrier is the fourth component carrier, or both, and wherein receiving the control signaling comprises:
receiving the control signaling indicating that the first component carrier, the second component carrier, or both, has a different starting and length indicator value configuration than the third component carrier belonging to the virtual component carrier, the fourth component carrier belonging to the virtual component carrier, or both.

8. The method of claim 1, wherein transmitting the joint feedback message comprises:
transmitting the joint feedback message in a control channel resource indicated by the downlink control information that is a latest received downlink control information as determined by a lowest index or a highest index out of the first component carrier, the second component carrier, and the virtual component carrier.

9. The method of claim 1, wherein transmitting the joint feedback message comprises:
transmitting the joint feedback message in a control channel resource indicated by the downlink control information that is a latest received downlink control information as determined by a lowest index or a highest index out of the first component carrier and the second component carrier.

10. The method of claim 1, wherein transmitting the joint feedback message comprises:
transmitting the joint feedback message in a control channel resource indicated by the downlink control information that is a latest received downlink control information as determined by a lowest index or a highest index out of the first component carrier, the second component carrier, the third component carrier belonging to the virtual component carrier, and the fourth component carrier belonging to the virtual component carrier.

11. The method of claim 1, further comprising:
receiving a control channel resource configuration that is common across single downlink control information to single component carrier scheduling and single downlink control information to multiple component carrier scheduling, wherein the joint feedback message is transmitted in a control channel resource indicated in the control channel resource configuration.

12. The method of claim 1, further comprising:
receiving a first control channel resource configuration for single downlink control information to single component carrier scheduling; and
receiving a second control channel resource configuration for single downlink control information to multiple component carrier scheduling that is different than the first control channel resource configuration.

13. The method of claim 12, wherein transmitting the joint feedback message comprises:
transmitting the joint feedback message in a control channel resource configured for the first component carrier or the second component carrier in the second control channel resource configuration based at least in part on receiving the downlink control information on a corresponding one of the first component carrier or the second component carrier.

14. The method of claim 12, wherein transmitting the joint feedback message comprises:
transmitting the joint feedback message in a control channel resource configured for the virtual component carrier in the second control channel resource configuration based at least in part on receiving the downlink control information on the virtual component carrier.

15. The method of claim 1, wherein receiving the control signaling comprises:
receiving the control signaling configuring the UE with the joint feedback codebook configuration that is a dynamic joint feedback codebook configuration.

16. The method of claim 15, wherein transmitting the joint feedback message comprises:
transmitting the joint feedback message having joint feedback data that is generated based at least in part on a counter value indicated in the downlink control information.

17. The method of claim 16, wherein a number by which the counter value is incremented to generate the joint feedback data is based at least in part on the downlink control information scheduling the virtual component carrier and whether feedback bundling is configured for the first component carrier and the second component carrier.

18. The method of claim 16, wherein a number by which the counter value is incremented to generate the joint feedback data is based at least in part on the downlink control information scheduling the virtual component carrier and whether the downlink control information schedules one or both of the first component carrier and the second component carrier.

19. The method of claim 1, wherein the first component carrier is the third component carrier, the second component carrier is the fourth component carrier, or both.

20. A method for wireless communications by a base station, comprising:
transmitting control signaling indicating a joint feedback codebook configuration for jointly reporting feedback for a first component carrier, a second component carrier, and a virtual component carrier that is mapped to a third component carrier and a fourth component carrier;
transmitting downlink control information scheduling a first downlink transmission via the first component carrier and a second downlink transmission on the second component carrier, or scheduling the first downlink transmission and the second downlink transmission via the virtual component carrier; and receiving a joint feedback message for the first component carrier, the second 10 component carrier, and the virtual component carrier based at least in part on the joint 11 feedback codebook configuration.

21. The method of claim 20, wherein transmitting the control signaling comprises:

transmitting the control signaling indicating the joint feedback codebook configuration that is a semi-static joint feedback codebook configuration.

22. The method of claim 21, wherein transmitting the control signaling comprises:

transmitting the control signaling that indicates a first shared data channel occasion on the first component carrier, a second shared data channel occasion on the second component carrier, and a first virtual shared data channel occasion and a second virtual shared data channel occasion on the virtual component carrier.

23. The method of claim 22, wherein receiving the joint feedback message comprises:

receiving the joint feedback message comprising feedback data for the first shared data channel occasion, the second shared data channel occasion, the first virtual shared data channel occasion, and the second virtual shared data channel occasion.

24. The method of claim 23, wherein receiving the joint feedback message comprises:

receiving the joint feedback message comprising feedback data that includes one or two bits, depending on a number of possible codewords, for each of the first shared data channel occasion, the second shared data channel occasion, the first virtual shared data channel occasion, and the second virtual shared data channel occasion.

25. The method of claim 23, wherein the first component carrier is the third component carrier, the second component carrier is the fourth component carrier, or both, and wherein receiving the joint feedback message comprises:

receiving the joint feedback message comprising feedback data that includes fewer than a single bit for each of the first shared data channel occasion, the second shared data channel occasion, the first virtual shared data channel occasion, and the second virtual shared data channel occasion, based at least in part on the first shared data channel occasion corresponding to a same resource as the first virtual shared data channel occasion, the second shared data channel occasion corresponding to a same resource as the second virtual shared data channel occasion, or both.

26. The method of claim 20, wherein the first component carrier is the third component carrier, the second component carrier is the fourth component carrier, or both, and wherein transmitting the control signaling comprises:

transmitting the control signaling indicating that the first component carrier, the second component carrier, or both, has a different starting and length indicator value configuration than the third component carrier belonging to the virtual component carrier, the fourth component carrier belonging to the virtual component carrier, or both.

27. The method of claim 20, wherein receiving the joint feedback message comprises:

receiving the joint feedback message in a control channel resource indicated by the downlink control information that is a latest received downlink control information as determined by a lowest index or a highest index out of the first component carrier, the second component carrier, and the virtual component carrier.

28. The method of claim 20, wherein receiving the joint feedback message comprises:

receiving the joint feedback message in a control channel resource indicated by the downlink control information that is a latest received downlink control information as determined by a lowest index or a highest index out of the first component carrier and the second component carrier.

29. The method of claim 20, wherein receiving the joint feedback message comprises:

receiving the joint feedback message in a control channel resource indicated by the downlink control information that is a latest received downlink control information as determined by a lowest index or a highest index out of the first component carrier, the second component carrier, the third component carrier belonging to the virtual component carrier, and the fourth component carrier belonging to the virtual component carrier.

30. The method of claim 20, further comprising:

transmitting a control channel resource configuration that is common across single downlink control information to single component carrier scheduling and single downlink control information to multiple component carrier scheduling, wherein the joint feedback message is transmitted in a control channel resource indicated in the control channel resource configuration.

31. The method of claim 20, further comprising:

transmitting a first control channel resource configuration for single downlink control information to single component carrier scheduling; and transmitting a second control channel resource configuration for single downlink control information to multiple component carrier scheduling that is different than the first control channel resource configuration.

32. The method of claim 31, wherein receiving the joint feedback message comprises:

receiving the joint feedback message in a control channel resource configured for the first component carrier or the second component carrier in the second control channel resource configuration based at least in part on receiving the downlink control information on a corresponding one of the first component carrier or the second component carrier.

33. The method of claim 31, wherein receiving the joint feedback message comprises:

receiving the joint feedback message in a control channel resource configured for the virtual component carrier in the second control channel resource configuration based at least in part on receiving the downlink control information on the virtual component carrier.

34. The method of claim 20, wherein transmitting the control signaling comprises:

transmitting the control signaling configuring a user equipment (UE) with the joint feedback codebook configuration that is a dynamic joint feedback codebook configuration.

35. The method of claim 34, wherein receiving the joint feedback message comprises:

receiving the joint feedback message having joint feedback data that is generated based at least in part on a counter value indicated in the downlink control information.

36. The method of claim 35, wherein a number by which the counter value is incremented to generate the joint feedback data is based at least in part on the downlink control information scheduling the virtual component carrier and whether feedback bundling is configured for the first component carrier and the second component carrier.

37. The method of claim 35, wherein a number by which the counter value is incremented to generate the joint feedback data is based at least in part on the downlink control information scheduling the virtual component carrier and whether the downlink control information schedules one or both of the first component carrier and the second component carrier.

38. The method of claim 20, wherein the first component carrier is the third component carrier, the second component carrier is the fourth component carrier, or both.

39. An apparatus for wireless communications by a user equipment (UE), comprising:
   a processor,
   memory coupled with the processor; and
   instructions stored in the memory and executable by the processor to cause the apparatus to:
      receive control signaling indicating a joint feedback codebook configuration for jointly reporting feedback for a first component carrier, a second component carrier, and a virtual component carrier that is mapped to a third component carrier and a fourth component carrier;
      receive downlink control information scheduling a first downlink transmission via the first component carrier and a second downlink transmission on the second component carrier, or scheduling the first downlink transmission and the second downlink transmission via the virtual component carrier; and
      transmit a joint feedback message for the first component carrier, the second component carrier, and the virtual component carrier based at least in part on the joint feedback codebook configuration.

40. The apparatus of claim 39, wherein the instructions to receive the control signaling are executable by the processor to cause the apparatus to:
   receive the control signaling indicating the joint feedback codebook configuration that is a semi-static joint feedback codebook configuration.

41. The apparatus of claim 40, wherein the instructions to receive the control signaling are executable by the processor to cause the apparatus to:
   receive the control signaling that indicates a first shared data channel occasion on the first component carrier, a second shared data channel occasion on the second component carrier, and a first virtual shared data channel occasion and a second virtual shared data channel occasion on the virtual component carrier.

42. The apparatus of claim 41, wherein the instructions to transmit the joint feedback message are executable by the processor to cause the apparatus to:
   transmit the joint feedback message comprising feedback data for the first shared data channel occasion, the second shared data channel occasion, the first virtual shared data channel occasion, and the second virtual shared data channel occasion.

43. The apparatus of claim 42, wherein the instructions to transmit the joint feedback message are executable by the processor to cause the apparatus to:
   transmit the joint feedback message comprising feedback data that includes one or two bits, depending on a number of possible codewords, for each of the first shared data channel occasion, the second shared data channel occasion, the first virtual shared data channel occasion, and the second virtual shared data channel occasion.

44. The apparatus of claim 42, wherein the first component carrier is the third component carrier, the second component carrier is the fourth component carrier, or both, and comprises:
   transmit the joint feedback message comprising feedback data that includes fewer than a single bit for each of the first shared data channel occasion, the second shared data channel occasion, the first virtual shared data channel occasion, and the second virtual shared data channel occasion, based at least in part on the first shared data channel occasion corresponding to a same resource as the first virtual shared data channel occasion, the second shared data channel occasion corresponding to a same resource as the second virtual shared data channel occasion, or both.

45. The apparatus of claim 39, wherein the first component carrier is the third component carrier, the second component carrier is the fourth component carrier, or both, and comprises:
   receive the control signaling indicating that the first component carrier, the second component carrier, or both, has a different starting and length indicator value configuration than the third component carrier belonging to the virtual component carrier, the fourth component carrier belonging to the virtual component carrier, or both.

46. The apparatus of claim 39, wherein the instructions to transmit the joint feedback message are executable by the processor to cause the apparatus to:
   transmit the joint feedback message in a control channel resource indicated by the downlink control information that is a latest received downlink control information as determined by a lowest index or a highest index out of the first component carrier, the second component carrier, and the virtual component carrier.

47. The apparatus of claim 39, wherein the instructions to transmit the joint feedback message are executable by the processor to cause the apparatus to:
   transmit the joint feedback message in a control channel resource indicated by the downlink control information that is a latest received downlink control information as determined by a lowest index or a highest index out of the first component carrier and the second component carrier.

48. The apparatus of claim 39, wherein the instructions to transmit the joint feedback message are executable by the processor to cause the apparatus to:
   transmit the joint feedback message in a control channel resource indicated by the downlink control information that is a latest received downlink control information as determined by a lowest index or a highest index out of the first component carrier, the second component carrier, the third component carrier belonging to the virtual component carrier, and the fourth component carrier belonging to the virtual component carrier.

49. The apparatus of claim 39, wherein the instructions are further executable by the processor to cause the apparatus to:
   receive a control channel resource configuration that is common across single downlink control information to single component carrier scheduling and single downlink control information to multiple component carrier scheduling, wherein the joint feedback message is transmitted in a control channel resource indicated in the control channel resource configuration.

50. The apparatus of claim 39, wherein the instructions are further executable by the processor to cause the apparatus to:
receive a first control channel resource configuration for single downlink control information to single component carrier scheduling; and
receive a second control channel resource configuration for single downlink control information to multiple component carrier scheduling that is different than the first control channel resource configuration.

51. The apparatus of claim 50, wherein the instructions to transmit the joint feedback message are executable by the processor to cause the apparatus to:
transmit the joint feedback message in a control channel resource configured for the first component carrier or the second component carrier in the second control channel resource configuration based at least in part on receiving the downlink control information on a corresponding one of the first component carrier or the second component carrier.

52. The apparatus of claim 50, wherein the instructions to transmit the joint feedback message are executable by the processor to cause the apparatus to:
transmit the joint feedback message in a control channel resource configured for the virtual component carrier in the second control channel resource configuration based at least in part on receiving the downlink control information on the virtual component carrier.

53. The apparatus of claim 39, wherein the instructions to receive the control signaling are executable by the processor to cause the apparatus to:
receive the control signaling configuring the UE with the joint feedback codebook configuration that is a dynamic joint feedback codebook configuration.

54. The apparatus of claim 53, wherein the instructions to transmit the joint feedback message are executable by the processor to cause the apparatus to:
transmit the joint feedback message having joint feedback data that is generated based at least in part on a counter value indicated in the downlink control information.

55. The apparatus of claim 54, wherein a number by which the counter value is incremented to generate the joint feedback data is based at least in part on the downlink control information scheduling the virtual component carrier and whether feedback bundling is configured for the first component carrier and the second component carrier.

56. The apparatus of claim 54, wherein a number by which the counter value is incremented to generate the joint feedback data is based at least in part on the downlink control information scheduling the virtual component carrier and whether the downlink control information schedules one or both of the first component carrier and the second component carrier.

57. The apparatus of claim 39, wherein the first component carrier is the third component carrier, the second component carrier is the fourth component carrier, or both.

58. An apparatus for wireless communications by a base station, comprising:
a processor,
memory coupled with the processor; and
instructions stored in the memory and executable by the processor to cause the apparatus to:
transmit control signaling indicating a joint feedback codebook configuration for jointly reporting feedback for a first component carrier, a second component carrier, and a virtual component carrier that is mapped to a third component carrier and a fourth component carrier;
transmit downlink control information scheduling a first downlink transmission via the first component carrier and a second downlink transmission on the second component carrier, or scheduling the first downlink transmission and the second downlink transmission via the virtual component carrier; and
receive a joint feedback message for the first component carrier, the second component carrier, and the virtual component carrier based at least in part on the joint feedback codebook configuration.

59. The apparatus of claim 58, wherein the instructions to transmit the control signaling are executable by the processor to cause the apparatus to:
transmit the control signaling indicating the joint feedback codebook configuration that is a semi-static joint feedback codebook configuration.

60. The apparatus of claim 59, wherein the instructions to transmit the control signaling are executable by the processor to cause the apparatus to:
transmit the control signaling that indicates a first shared data channel occasion on the first component carrier, a second shared data channel occasion on the second component carrier, and a first virtual shared data channel occasion and a second virtual shared data channel occasion on the virtual component carrier.

61. The apparatus of claim 60, wherein the instructions to receive the joint feedback message are executable by the processor to cause the apparatus to:
receive the joint feedback message comprising feedback data for the first shared data channel occasion, the second shared data channel occasion, the first virtual shared data channel occasion, and the second virtual shared data channel occasion.

62. The apparatus of claim 61, wherein the instructions to receive the joint feedback message are executable by the processor to cause the apparatus to:
receive the joint feedback message comprising feedback data that includes one or two bits, depending on a number of possible codewords, for each of the first shared data channel occasion, the second shared data channel occasion, the first virtual shared data channel occasion, and the second virtual shared data channel occasion.

63. The apparatus of claim 61, wherein the first component carrier is the third component carrier, the second component carrier is the fourth component carrier, or both, and comprises:
receive the joint feedback message comprising feedback data that includes fewer than a single bit for each of the first shared data channel occasion, the second shared data channel occasion, the first virtual shared data channel occasion, and the second virtual shared data channel occasion, based at least in part on the first shared data channel occasion corresponding to a same resource as the first virtual shared data channel occasion, the second shared data channel occasion corresponding to a same resource as the second virtual shared data channel occasion, or both.

64. The apparatus of claim 58, wherein the first component carrier is the third component carrier, the second component carrier is the fourth component carrier, or both, and comprises:
transmit the control signaling indicating that the first component carrier, the second component carrier, or both, has a different starting and length indicator value configuration than the third component carrier belonging to the virtual component carrier, the fourth component carrier belonging to the virtual component carrier, or both.

65. The apparatus of claim 58, wherein the instructions to receive the joint feedback message are executable by the processor to cause the apparatus to:
receive the joint feedback message in a control channel resource indicated by the downlink control information that is a latest received downlink control information as determined by a lowest index or a highest index out of the first component carrier, the second component carrier, and the virtual component carrier.

66. The apparatus of claim 58, wherein the instructions to receive the joint feedback message are executable by the processor to cause the apparatus to:
receive the joint feedback message in a control channel resource indicated by the downlink control information that is a latest received downlink control information as determined by a lowest index or a highest index out of the first component carrier and the second component carrier.

67. The apparatus of claim 58, wherein the instructions to receive the joint feedback message are executable by the processor to cause the apparatus to:
receive the joint feedback message in a control channel resource indicated by the downlink control information that is a latest received downlink control information as determined by a lowest index or a highest index out of the first component carrier, the second component carrier, the third component carrier belonging to the virtual component carrier, and the fourth component carrier belonging to the virtual component carrier.

68. The apparatus of claim 58, wherein the instructions are further executable by the processor to cause the apparatus to:
transmit a control channel resource configuration that is common across single downlink control information to single component carrier scheduling and single downlink control information to multiple component carrier scheduling, wherein the joint feedback message is transmitted in a control channel resource indicated in the control channel resource configuration.

69. The apparatus of claim 58, wherein the instructions are further executable by the processor to cause the apparatus to:
transmit a first control channel resource configuration for single downlink control information to single component carrier scheduling; and
transmit a second control channel resource configuration for single downlink control information to multiple component carrier scheduling that is different than the first control channel resource configuration.

70. The apparatus of claim 69, wherein the instructions to receive the joint feedback message are executable by the processor to cause the apparatus to:
receive the joint feedback message in a control channel resource configured for the first component carrier or the second component carrier in the second control channel resource configuration based at least in part on receiving the downlink control information on a corresponding one of the first component carrier or the second component carrier.

71. The apparatus of claim 69, wherein the instructions to receive the joint feedback message are executable by the processor to cause the apparatus to:
receive the joint feedback message in a control channel resource configured for the virtual component carrier in the second control channel resource configuration based at least in part on receiving the downlink control information on the virtual component carrier.

72. The apparatus of claim 58, wherein the instructions to transmit the control signaling are executable by the processor to cause the apparatus to:
transmit the control signaling configuring a user equipment (UE) with the joint feedback codebook configuration that is a dynamic joint feedback codebook configuration.

73. The apparatus of claim 72, wherein the instructions to receive the joint feedback message are executable by the processor to cause the apparatus to:
receive the joint feedback message having joint feedback data that is generated based at least in part on a counter value indicated in the downlink control information.

74. The apparatus of claim 73, wherein a number by which the counter value is incremented to generate the joint feedback data is based at least in part on the downlink control information scheduling the virtual component carrier and whether feedback bundling is configured for the first component carrier and the second component carrier.

75. The apparatus of claim 73, wherein a number by which the counter value is incremented to generate the joint feedback data is based at least in part on the downlink control information scheduling the virtual component carrier and whether the downlink control information schedules one or both of the first component carrier and the second component carrier.

76. The apparatus of claim 58, wherein the first component carrier is the third component carrier, the second component carrier is the fourth component carrier, or both.

77. An apparatus for wireless communications by a user equipment (UE), comprising:
means for receiving control signaling indicating a joint feedback codebook configuration for jointly reporting feedback for a first component carrier, a second component carrier, and a virtual component carrier that is mapped to a third component carrier and a fourth component carrier;
means for receiving downlink control information scheduling a first downlink transmission via the first component carrier and a second downlink transmission on the second component carrier, or scheduling the first downlink transmission and the second downlink transmission via the virtual component carrier; and
means for transmitting a joint feedback message for the first component carrier, the second component carrier, and the virtual component carrier based at least in part on the joint feedback codebook configuration.

78. An apparatus for wireless communications by a base station, comprising:
means for transmitting control signaling indicating a joint feedback codebook configuration for jointly reporting feedback for a first component carrier, a second component carrier, and a virtual component carrier that is mapped to a third component carrier and a fourth component carrier;
means for transmitting downlink control information scheduling a first downlink transmission via the first component carrier and a second downlink transmission on the second component carrier, or scheduling the first downlink transmission and the second downlink transmission via the virtual component carrier; and means for receiving a joint feedback message for the first component carrier, the second component carrier, and the virtual component carrier based at least in part on the joint feedback codebook configuration.

79. A non-transitory computer-readable medium storing code for wireless communications by a user equipment (UE), the code comprising instructions executable by a processor to:

receive control signaling indicating a joint feedback codebook configuration for jointly reporting feedback for a first component carrier, a second component carrier, and a virtual component carrier that is mapped to a third component carrier and a fourth component carrier;

receive downlink control information scheduling a first downlink transmission via the first component carrier and a second downlink transmission on the second component carrier, or scheduling the first downlink transmission and the second downlink transmission 10 via the virtual component carrier; and transmit a joint feedback message for the first component carrier, the second component carrier, and the virtual component carrier based at least in part on the joint feedback codebook configuration.

80. A non-transitory computer-readable medium storing code for wireless communications by a base station, the code comprising instructions executable by a processor to:

transmit control signaling indicating a joint feedback codebook configuration for jointly reporting feedback for a first component carrier, a second component carrier, and a virtual component carrier that is mapped to a third component carrier and a fourth component carrier;

transmit downlink control information scheduling a first downlink transmission via the first component carrier and a second downlink transmission on the second component carrier, or scheduling the first downlink transmission and the second downlink transmission via the virtual component carrier; and receive a joint feedback message for the first component carrier, the second component carrier, and the virtual component carrier based at least in part on the joint feedback codebook configuration.

* * * * *